US008339531B2

(12) United States Patent
Yamauchi

(10) Patent No.: US 8,339,531 B2
(45) Date of Patent: Dec. 25, 2012

(54) DISPLAY DEVICE

(75) Inventor: Yoshimitsu Yamauchi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 13/508,003

(22) PCT Filed: Jul. 22, 2010

(86) PCT No.: PCT/JP2010/062318
§ 371 (c)(1),
(2), (4) Date: May 3, 2012

(87) PCT Pub. No.: WO2011/055572
PCT Pub. Date: May 12, 2011

(65) Prior Publication Data

US 2012/0218252 A1 Aug. 30, 2012

(30) Foreign Application Priority Data

Nov. 6, 2009 (JP) ................................ 2009-255391

(51) Int. Cl.
*G02F 1/136* (2006.01)

(52) U.S. Cl. .......... 349/41; 349/139; 349/143; 349/145; 349/149; 349/151

(58) Field of Classification Search .................... 349/33, 349/41, 42, 43, 139, 143, 145, 149, 151
See application file for complete search history.

(56) References Cited

U.S. PATENT DOCUMENTS 7,304,674 B2 * 12/2007 Mentzer et al. ............... 348/300
8,058,795 B2 * 11/2011 Asano ........................... 313/503
2004/0130544 A1 7/2004 Sun (Continued)

FOREIGN PATENT DOCUMENTS

JP 61-69283 4/1986

(Continued)

OTHER PUBLICATIONS

International Search Report mailed Aug. 17, 2010, directed to International Patent Application No. PCT/JP2010/062318; 4 pages.

*Primary Examiner* — Jennifer Doan
(74) *Attorney, Agent, or Firm* — Morrison & Foerster LLP

(57) ABSTRACT

A display device in which a pixel voltage is held at low power consumption without any influence from fluctuation in threshold voltage is provided. A liquid crystal capacitor element (Clc) is formed between a pixel electrode (20) and a counter electrode (80). A counter voltage (Vcom) is applied to the counter electrode (80). The pixel electrode (20), one ends of a first switch circuit (22) and a second switch circuit (23), and a first terminal of a second transistor (T2) form an internal node (N1). The other end of the first switch circuit (22) is connected to a source line (SL). The second switch circuit (23) has the other end connected to a voltage supply line (VSL) and is a series circuit of transistors (T1 and T2). A control terminal of the transistor (T1), a second terminal of the transistor (T2), and one end of the boost capacitor element (Cbst) form an output node (N2). The other end of the boost capacitor element (Cbst), the control terminal of the transistor (T2), and the control terminal of the transistor (T3) are connected to a boost line (BST), a reference line (REF), and a selecting line (SEL), respectively.

6 Claims, 27 Drawing Sheets

U.S. PATENT DOCUMENTS

| | | | | |
|---|---|---|---|---|
| 2006/0232577 | A1 | 10/2006 | Edwards et al. | |
| 2009/0079684 | A1 * | 3/2009 | Watanabe | 345/92 |

FOREIGN PATENT DOCUMENTS

| | | |
|---|---|---|
| JP | 61-74481 | 4/1986 |
| JP | 2004-212924 | 7/2004 |
| JP | 2005-18088 | 1/2005 |
| JP | 2006-343563 | 12/2006 |
| JP | 2007-502068 | 2/2007 |
| JP | 2007-334224 | 12/2007 |

* cited by examiner

| | | | | | |
|---|---|---|---|---|---|
| T1(H) | ON | ON | ON | ON | OFF |
| T1(L) | (OFF) | OFF | OFF | OFF | (OFF) |
| T2(H) | OFF | OFF | OFF | OFF | OFF |
| T2(L) | ON | OFF | OFF | OFF | ON |
| T3 | OFF | OFF | OFF | ON | OFF |
| T4 | OFF | OFF | OFF | OFF | OFF |

| | | | | | |
|---|---|---|---|---|---|
| T1(H) | ON | ON | ON | ON | OFF |
| T1(L) | (OFF) | OFF | OFF | OFF | (OFF) |
| T2(H) | OFF | OFF | OFF | OFF | OFF |
| T2(L) | ON | OFF | OFF | ON | ON |
| T3 | OFF | OFF | OFF | ON | OFF |
| T4 | OFF | OFF | OFF | OFF | OFF |

| | | | | | |
|---|---|---|---|---|---|
| T1(H) | ON | ON | ON | ON | OFF |
| T1(L) | (OFF) | OFF | OFF | OFF | (OFF) |
| T2(H) | OFF | OFF | OFF | OFF | OFF |
| T2(L) | ON | OFF | OFF | ON | ON |
| T3 | OFF | OFF | OFF | ON | OFF |
| T4 | OFF | OFF | OFF | OFF | OFF |

DISPLAY DEVICE

REFERENCE TO RELATED APPLICATIONS

This application is a national stage under 35 U.S.C. §371 of International Application No. PCT/JP2010/062318 filed on Jul. 22, 2010, which claims priority from Japanese Patent Application No. 2009-255391 filed on Nov. 6, 2009, the contents of which are incorporated herein by reference in their entireties.

FIELD OF THE INVENTION

The present invention relates to a pixel circuit and a display device including the pixel circuit and, in particular, to an active-matrix type display device.

BACKGROUND OF THE INVENTION

In a mobile terminal such as a cellular phone or a mobile game console, a liquid crystal display device is generally used as a display means. Since a cellular phone is driven by a battery, a power consumption is strongly required to be reduced. For this reason, information such as time or a battery life, which is required to be always displayed, is displayed on a reflective sub-panel. In recent years, on the same main panel, a normal display by a full-color display and a reflective always-on display have been required to be compatible.

FIG. 26 shows an equivalent circuit of a pixel circuit in a general active-matrix type liquid crystal display device. FIG. 27 shows an example of a circuit arrangement of an active-matrix type liquid crystal display device having m×n pixels. Both reference symbols m and n denote integers each of which is 2 or more.

As shown in FIG. 27, switch elements configured by thin film transistors (TFTs) are arranged at intersections between m source lines SL1, SL2, . . . , SLm and n scanning lines GL1, GL2, . . . , GLn. In FIG. 26, the source lines SL1, SL2, . . . , SLm are represented by a source line SL, and, similarly, the scanning lines GL1, GL2, . . . , GLn are represented by a symbol GL.

As shown in FIG. 26, a liquid crystal capacitor element Clc and an auxiliary capacitor element Cs are connected in parallel to each other through a TFT. The liquid crystal capacitor element Clc is configured by a laminated structure in which a liquid crystal layer is formed between a pixel electrode 20 and a counter electrode 80. The counter electrode is also called a common electrode.

FIG. 27 simply shows only a TFT and a pixel electrode (black rectangular portion) in each pixel circuit.

The auxiliary capacitor element Cs has one end (one electrode) connected to the pixel electrode 20 and the other end (other electrode) connected to an auxiliary capacitive line CSL to stabilize a voltage of pixel data held in the pixel electrode 20. The auxiliary capacitor element Cs advantageously suppresses a voltage of pixel data held in a pixel electrode from varying due to generation of a leakage current in the TFT, a variation in electric capacity of the liquid crystal capacitor element Clc between a black display and a white display caused by dielectric anisotropy held by liquid crystal molecules, a variation in voltage through a parasitic capacity between a pixel electrode and a peripheral wire, and the like. Voltages of the scanning lines are sequentially controlled to turn on TFTs connected to one scanning line, and voltages of pixel data supplied to source lines are written in corresponding pixel electrodes, respectively, in units of scanning lines.

In a normal display by a full-color display, even though display contents are a still image, the same display contents are repeatedly written in the same pixel for each frame. In this manner, the voltages of the pixel data held in the pixel electrodes are updated to minimize a variation in voltage of the pixel data and to secure a display of a high-quality still image.

A power consumption to drive a liquid crystal display device is almost controlled by a power consumption to drive a source line by a source driver, and is almost expressed by a relational expression represented by the following numerical expression 1. In numerical expression 1, reference symbol P denotes a power consumption; f, a refresh rate (the number of times of a refresh action of one frame per unit time); C, a load capacity driven by a source driver; V, a drive voltage of the source driver; n, the number of scanning lines; and m, the number of source lines. In this case, the refresh action is an operation that applies a voltage to a pixel electrode through a source line while keeping display contents.

$$P \propto f \cdot C \cdot V2 \cdot n \cdot m \quad \text{(Numerical Expression 1)}$$

In the always-on display, since the display contents are a still image, the voltage of the pixel data needs not be always updated for each frame. For this reason, in order to further reduce the power consumption of the liquid crystal display device, a refresh frequency in the always-on display state is lowered. However, when the refresh frequency is lowered, a pixel data voltage held in a pixel electrode varies by a leakage current of a TFT. The variation in voltage causes a variation in display luminance (transmittance of liquid crystal) of each pixel and becomes to be observed as flickers. Since an average potential in each frame period also decreases, deterioration of display quality such as insufficient contrast may be possibly caused.

In this case, as a method of simultaneously realizing a solution of a problem of deterioration of display quality caused by a decrease in refresh frequency and a reduction in power consumption in an always-on display of a still image such as a display of a battery life or time, for example, a configuration described in the following Patent Document 1 is disclosed. In the configuration disclosed in Patent Document 1, liquid crystal displays by both transmissive and reflective functions are possible. Furthermore, a memory unit is arranged in a pixel circuit in a pixel area in which a reflective liquid crystal display can be obtained. The memory unit holds information to be displayed in a reflective liquid crystal display unit as a voltage signal. In a reflective liquid crystal display state, a voltage held in the memory unit of the pixel circuit is read to display information corresponding to the voltage.

In Patent Document 1, the memory unit is configured by an SRAM, and the voltage signal is statically held. For this reason, a refresh action is not required, and maintenance of display quality and a reduction in power consumption can be simultaneously realized.

Patent Document 1: Unexamined Japanese Patent Publication No. 2007-334224

SUMMARY OF THE INVENTION

However, when the above configuration is applied to a liquid crystal display device used in a cellular phone or the like, in addition to an auxiliary capacitor element to hold a voltage of each pixel data serving as analog information in a normal operation, a memory unit to store the pixel data needs to be arranged for each pixel or each pixel group. In this manner, since the numbers of elements and signal lines to be formed on an array substrate (active matrix substrate) that configures the display unit in the liquid crystal display device increase, an aperture ratio in a transmission mode decreases. When a polarity-inverted drive circuit to AC-drive a liquid crystal is arranged together with the memory unit, the aperture ratio further decreases. In this manner, when the aperture ratio decreases due to the increase in number of elements or signal lines, a luminance of a display image decreases in a normal display mode.

A transistor element configuring each pixel circuit has a threshold value that fluctuates to some extent in the process. The fluctuation in threshold value may influence a pixel voltage.

The present invention has been made in consideration of the above problems and, it is an object of the present invention to provide a display device that can prevent deterioration of a liquid crystal and display quality with a low power consumption without causing a decrease in aperture ratio. In particular, it is an object to provide a display device that can maintain a pixel voltage obtained after writing even in a pixel circuit including a transistor element having a threshold value that is small due to a fluctuation in threshold voltage.

In order to achieve the above object, according to the present invention, there is provided a display device, having a pixel circuit group provided by arranging a plurality of pixel circuits, wherein the pixel circuit includes:

a display element unit including a unit display element;

an internal node that is a part of the display element unit and holds a voltage of pixel data applied to the display element unit;

a first switch circuit that transfers the voltage of the pixel data supplied from a data signal line to the internal node through at least a predetermined switch element;

a second switch circuit that transfers a voltage supplied to a predetermined voltage supply line to the internal node without passing through the predetermined switch element; and a control circuit that holds a predetermined voltage depending on the voltage of the pixel data held by the internal node at one end of a first capacitor element and controls on/off of the second switch circuit, the second switch circuit includes a first transistor element and a third transistor element, the control circuit includes a second transistor element, and each of the first to third transistor elements has a first terminal, a second terminal, and a control terminal that controls conduction between the first and second terminals, the second switch circuit is configured by a series circuit of the first transistor element and the third transistor element, the control circuit is configured by a series circuit of the second transistor element and the first capacitor element, one end of the first switch circuit is connected to the data signal line, one end of the second switch circuit is connected to the voltage supply line, the other ends of the first and second switch circuits and the first terminal of the second transistor element are connected to the internal node, the control terminal of the first transistor element, the second terminal of the second transistor element, and one end of the first capacitor element are connected to each other to form an output node of the control circuit, the control terminal of the second transistor element is connected to a first control line, the control terminal of the third transistor element is connected to a second control line, the other end of the first capacitor element is connected to the third control line, the predetermined switch element is a fourth transistor element having a first terminal, a second terminal, and a control terminal that controls conduction between the first and second terminals, and the control terminal is connected to a scanning signal line, a data signal line drive circuit that independently drives the data signal lines, a control line drive circuit that independently drives the first and second control lines, and a scanning signal line drive circuit that drives the scanning signal line are provided, in a self-refresh action for compensating for a voltage change of the internal nodes at the same time by operating the second switch circuits and the control circuits in the plurality of pixel circuits, the scanning signal line drive circuit applies a predetermined voltage to the scanning signal lines connected to all the pixel circuits included in the pixel circuit group to turn off the fourth transistor elements, the control line drive circuit applies a predetermined voltage to the second control line to turn off the third transistor element, and applies a first control voltage to the first control line such that when a voltage state of binary pixel data held by the internal node is in a first voltage state, a current flowing from one end of the first capacitor element to the internal node is cut off by the second transistor element, and when the voltage state is in a second voltage state, the second transistor element is turned on, thereafter, the control line drive circuit applies a first boost voltage to the third control line to give a voltage change caused by capacitive coupling through the first capacitor element to one end of the first capacitor element, so that when the voltage of the internal node is in the first voltage state, the voltage change is not suppressed and the first transistor element is turned on, thereafter, the control line drive circuit changes an applied voltage to the first control line into a second control voltage, so that a current flowing from one end of the first capacitor element to the internal node is cut off by the second transistor element regardless of whether the voltage state of the internal node is in the first voltage state or the second voltage state, thereafter, the control line drive circuit changes an applied voltage to the third control line into a second boost voltage that is closer to a ground voltage than the first boost voltage to give a voltage change caused by capacitive coupling through the first capacitor element to one end of the first capacitor element so as to shift a potential of the output node toward the ground potential, so that when the voltage state of the internal node is in the first voltage state, the first transistor element is continuously turned on, and when the voltage state is in the second voltage state, the first transistor element is turned off, and, thereafter, the control line drive circuit changes an applied voltage to the second control line to turn on the third transistor element so as to supply the voltage of the pixel data in the first voltage state to all the voltage supply lines connected to the plurality of pixel circuits targeted by the self-refresh action.

At this time, the voltage supply line may be also used as a data signal line. When the pixel circuit further includes a second capacitor element having one end connected to the internal node and the other end connected to a fourth control line, the voltage supply line can also be used as the fourth control line.

With the configuration of the present invention, in addition to a normal writing action, an action (self-refresh action) that returns an absolute value of a voltage across both the terminals of the display element unit to a value in the immediately previous writing action without performing a writing action can be executed. In particular, according to the present invention, when a pulse voltage is applied once, only a pixel circuit having an internal node to be returned to a voltage state of a target gradation level among the plurality of pixel circuits can be automatically refreshed, and a self-refresh action can be performed in a situation in which voltage states at multi-value levels are held in the internal nodes.

When a plurality of pixel circuits are arranged, a normal writing action is generally executed for each row. For this reason, at the maximum, a driver circuit needs to be driven the number of times which is equal to the number of rows of the arranged pixel circuits. In contrast to this, according to the pixel circuit of the present invention, a self-refresh action is performed to make it possible to execute a refresh action to the plurality of arranged pixels at once for each of the held voltage states. For this reason, the number of times of driving of a driver circuit required from the start of the refresh action to the end thereof can be greatly reduced to make it possible to realize a low power consumption. Since a memory unit such as an SRAM needs not be additionally arranged in the pixel circuit, an aperture ratio does not decrease unlike in the conventional art.

In particular, according to the configuration of the present invention, even though a transistor element in a pixel circuit has a small threshold value, a pixel voltage immediately after writing can be maintained without being influenced by the small threshold value. The reason will be described below.

In a self-refresh action performed by the display device according to the present invention, only when an internal node is in a first voltage state (high-level voltage), a voltage in the first voltage state is supplied from a voltage supply line. On the other hand, when the internal node is in a second voltage state (low-level voltage), the voltage is not supplied. In this manner, a refresh action is automatically selectively executed to only a pixel circuit in which an internal node immediately after writing is in the first voltage state. However, in order to reliably perform the action, in a pixel circuit in which an internal node immediately after writing is in the second voltage state, the circuit must be configured not to supply a voltage in the first voltage state supplied from the voltage supply line to the internal node. The control is realized by turn-on/off control of the second switch circuit.

The second switch circuit is configured to have a third transistor element and a first transistor element. In a self-refresh action, after the third transistor element is turned on regardless of the voltage state of the internal node, the voltage in the first voltage state is supplied from the voltage supply line. For this reason, the turn-on/off control of the second switch circuit is substantially performed by turn-on/off control of the first transistor element.

The turn-on/off control of the first transistor element is performed by varying a potential of an output node by voltage application to the third control line. When the internal node is in the first voltage state, the potential of the output node is shifted in a direction away from the ground potential by applying a voltage to the third control line while the second transistor is cut off, thereby turning on the first transistor element. When the first transistor element is of an n-channel type, a positive first boost voltage may be applied to positively raise the potential of the output node. When the first transistor element is of a p-channel type, a negative first boost voltage may be applied to negatively drop the potential of the output node.

On the other hand, when the internal node is in the second voltage state, a voltage is applied to the third control line in a state in which the second transistor element is turned on in a direction from the output node to the internal node to prevent the potential of the output node from being largely changed, thereby turning off the first transistor element.

However, even though the internal node is in the second voltage state, when a threshold voltage of the first transistor element is low, a leakage current from the voltage supply line to the internal node is generated, so that the potential of the internal node may disadvantageously change.

For this reason, in the configuration of the present invention, in the previous step of turning on the third transistor element, an applied voltage to the third control line is changed into the second boost voltage that is closer to the ground voltage than the first boost voltage, and the potential of the output node, i.e., the potential of the control terminal of the first transistor element is shifted to a ground potential side, thereby reliably turning off the first transistor element when the internal node is in the second voltage state. At this time, although the potential of the output node shifts to the ground potential side even when the internal node is in the first voltage state, since the potential of the output node largely shifts in a direction (positive direction in an n-channel type) away from the ground potential when the first boost voltage is applied, the turn-on state of the first transistor element can be still continued even though the potential slightly shifts to the ground potential side. More specifically, the boost voltage needs to have a value that reliably turns on the second transistor when the internal node is in the second voltage state and continuously turns on the second transistor element when the internal node is in the first voltage state.

With the above configuration, if the threshold voltage of the first transistor element is low, a voltage in the first voltage state is applied to the voltage supply line to make it possible to automatically selectively execute a refresh action to only a pixel circuit in which an internal node is in the first voltage state without causing a potential change of the internal node in a pixel circuit in which an internal node is in the second potential state.

BRIEF DESCRIPTION OF THE INVENTION

Figure 26:
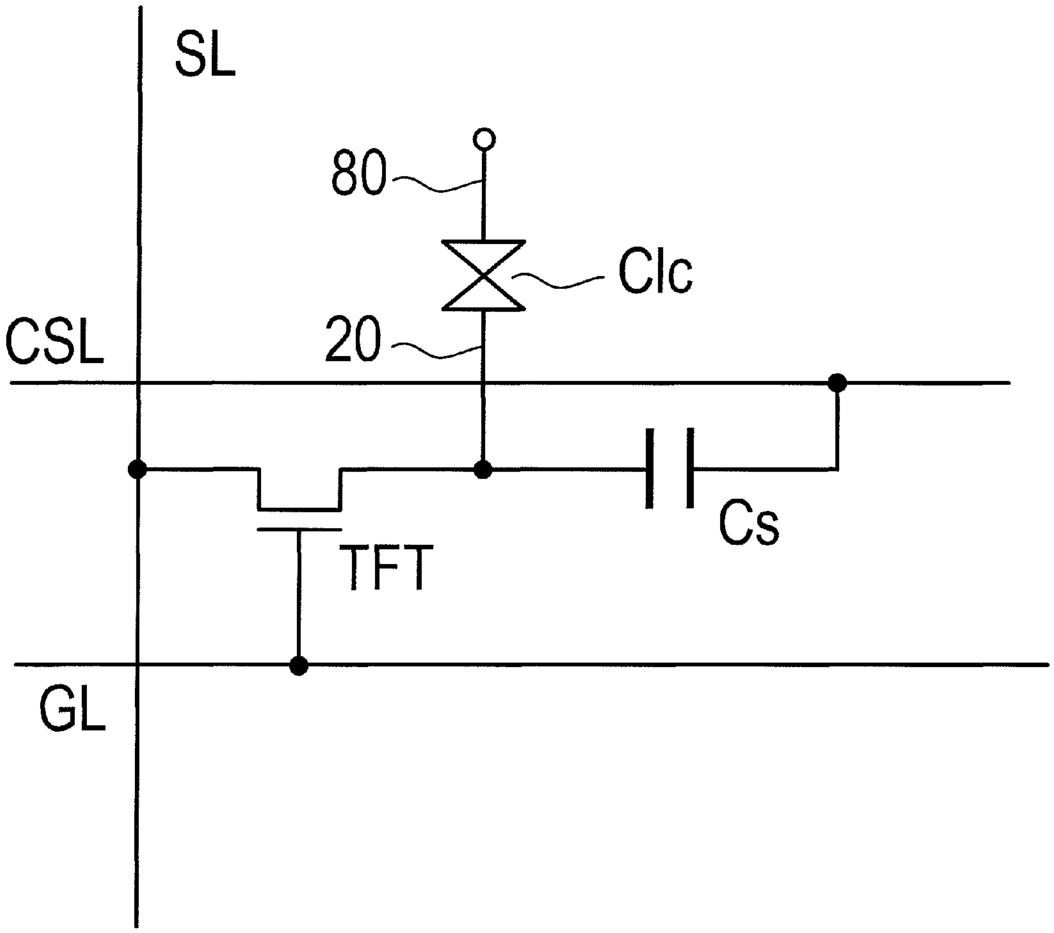
FIG. 26 is an equivalent circuit diagram of a pixel circuit in a general active-matrix type liquid crystal display device.
Figure 27:
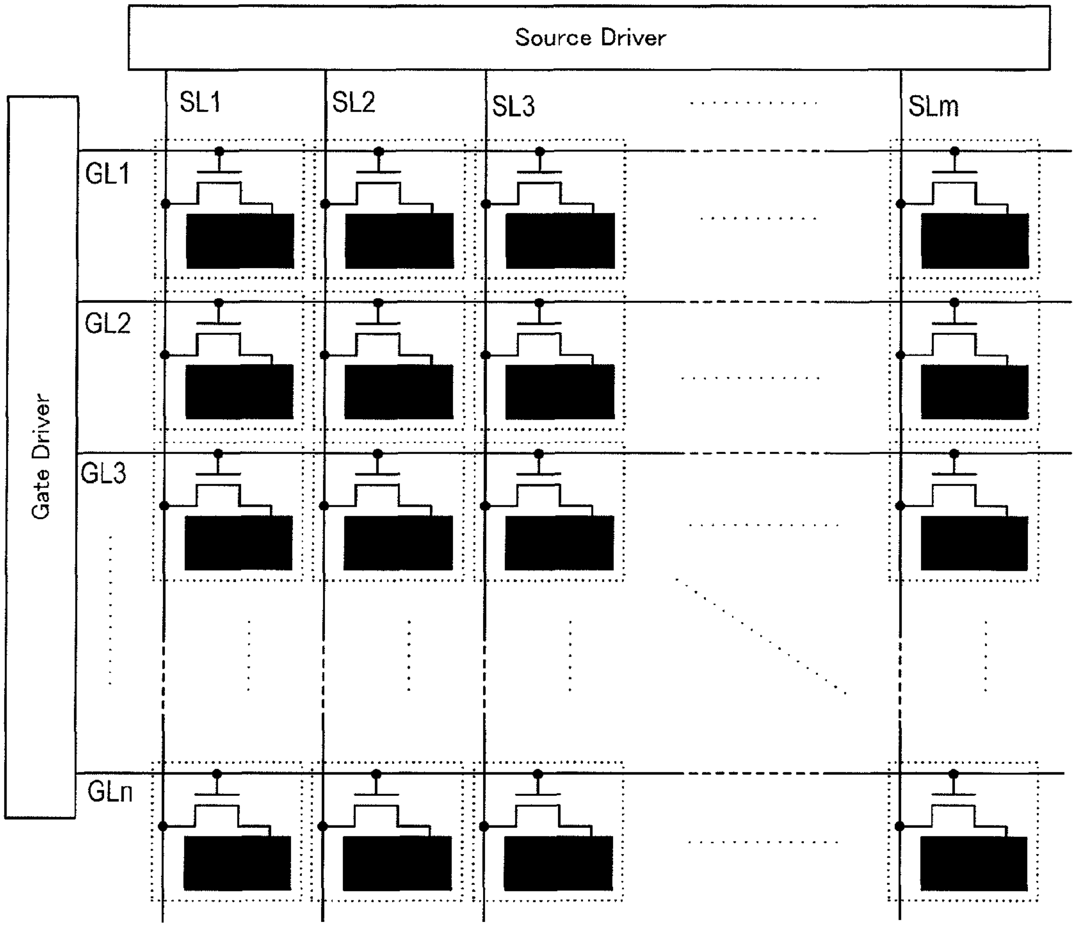
FIG. 27 is a block diagram showing a circuit arrangement of an active-matrix type liquid crystal display device having m×n pixels.

Embodiments of a pixel circuit and a display device of the present invention will be described below with reference to the accompanying drawings. The same reference numerals as in FIGS. 26 and 27 denote the same constituent elements, respectively.

First Embodiment

In the first embodiment, configurations of a display device of the present invention (to be simply referred to as a "display device" hereinafter) and a pixel circuit included in the display device will be described below.

<Display Device>

Figure 1:
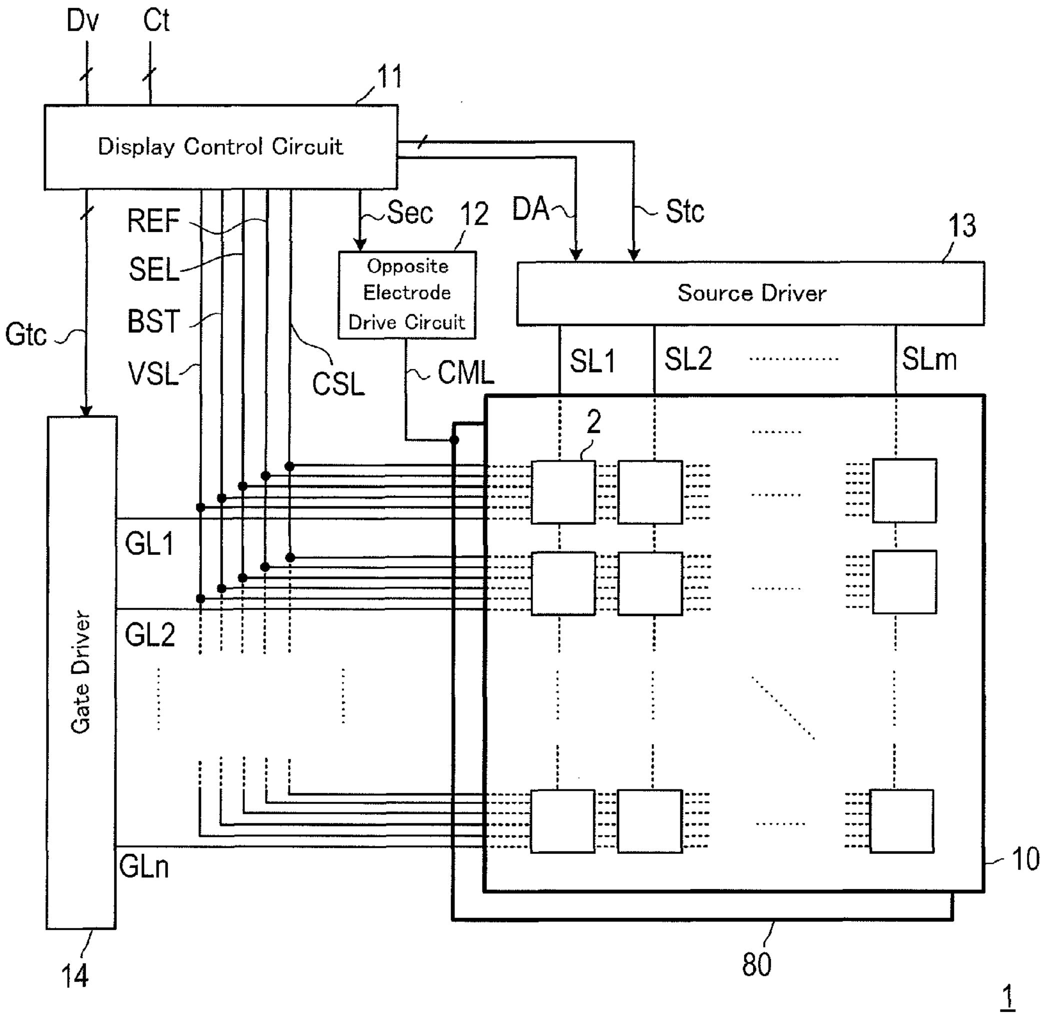
FIG. 1 is a block diagram showing an example of a schematic configuration of a display device according to the present invention.

FIG. 1 shows a schematic configuration of a display device 1. The display device 1 includes an active matrix substrate 10, a counter electrode 80, a display control circuit 11, a counter electrode drive circuit 12, a source driver 13, a gate driver 14, and various signal lines (will be described later). On the active matrix substrate 10, a plurality of pixel circuits 2 are arranged in row and column directions to form a pixel circuit array.

In FIG. 1, to avoid the drawings from being complex, the pixel circuits 2 are shown as a block. In order to clarify that the various signal lines are formed on the active matrix substrate 10, for descriptive convenience, the active matrix substrate 10 is shown on the upper side of the counter electrode 80.

In the embodiment, the display device 1 has a configuration in which the same pixel circuits 2 are used to make it possible to perform screen display in two display modes including a normal display mode and an always-on display mode. The normal display mode is a display mode that displays a moving image or a still image in full color and uses a transmissive liquid crystal display using a back light. On the other hand, the always-on display mode of the embodiment is a display mode that performs two-tone (black and white) display in units of pixel circuits and allocates the three adjacent pixel circuits 2 to three primary colors (R, G, and B), respectively, to display eight colors. Furthermore, in the always-on display mode, a plurality of sets of three adjacent pixel circuits can also be combined to each other to increase the number of display colors by area coverage modulation. The always-on display mode according to the embodiment is a technique that can be used in transmissive liquid crystal display and reflective liquid crystal display.

In the following explanation, for descriptive convenience, a minimum display unit corresponding to one pixel circuit 2 is called a "pixel", and "pixel data" written in each of the pixel circuits serves as tone data of each color in color display in three primary colors (R, G, and B). When color display is to be performed by using black and white luminance data in addition to the three primary colors, the luminance data is also included in pixel data.

Figure 2:
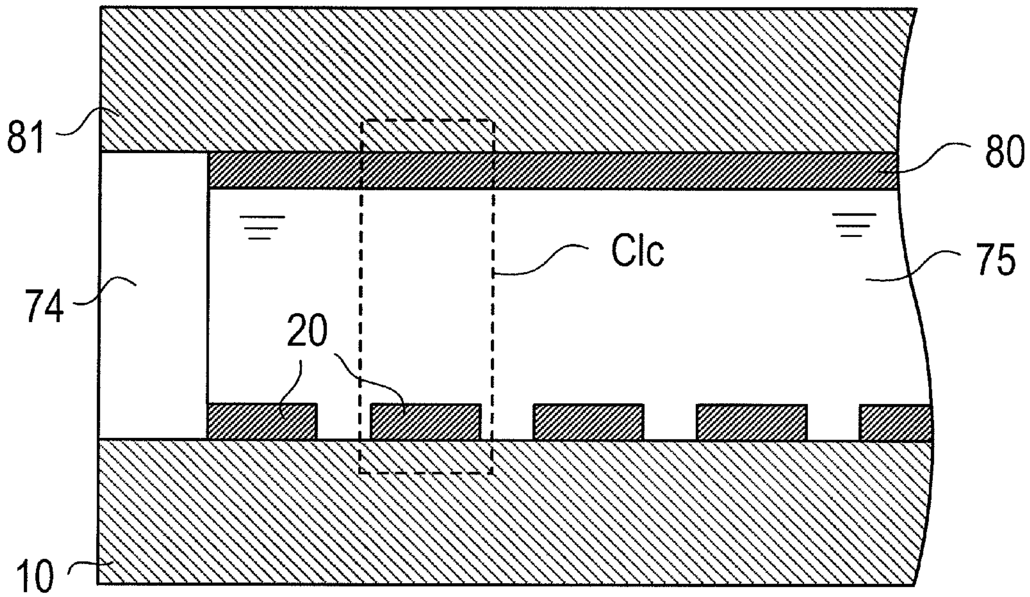
FIG. 2 is a schematic structural diagram of a partial section of a liquid display device.

FIG. 2 is a schematic sectional structural diagram showing a relation between the active matrix substrate 10 and the counter electrode 80, and shows a structure of a display element unit 21 (see FIG. 4) serving as a constituent element of the pixel circuit 2. The active matrix substrate 10 is a light-transmitting transparent substrate made of, for example, glass or plastic.

As illustrated in FIG. 1, the pixel circuits 2 including signal lines are formed on the active matrix substrate 10. In FIG. 2, the pixel electrode 20 is illustrated as a representative of a constituent element of the pixel circuit 2. The pixel electrode 20 is made of a light-transmitting transparent conductive material, for example, ITO (indium tin oxide).

A light-transmitting counter substrate 81 is arranged so as to face the active matrix substrate 10, and a liquid crystal layer 75 is held in a gap between both the substrates. Deflection plates (not shown) are stuck to outer surfaces of both the substrates.

The liquid crystal layer 75 is sealed by a seal member 74 at the peripheral portions of both the substrates. On the counter substrate 81, the counter electrode 80 made of a light-transmitting transparent conductive material such as ITO is formed so as to face the pixel electrode 20. The counter electrode 80 is formed as a single film so as to spread on an almost entire surface of the counter substrate 81. In this case, a unit liquid crystal display element Clc (see FIG. 4) is formed by one pixel electrode 20, the counter electrode 80, and the liquid crystal layer 75 held between the pixel electrode 20 and the counter electrode 80.

A back light device (not shown) is arranged on a rear surface side of the active matrix substrate 10 to make it possible to emit light oriented from the active matrix substrate 10 to the counter substrate 81.

As shown in FIG. 1, a plurality of signal lines are formed in vertical and horizontal directions on the active matrix substrate 10. The plurality of pixel circuits 2 are formed in the form of a matrix at positions where m source lines (SL1, SL2, . . . , SLm) extending in the vertical direction (column direction) and n gate lines (GL1, GL2, . . . , GLn) extending in the horizontal direction (row direction) intersect with each other. Both reference symbols m and n denote natural numbers that are 2 or more. Each of the source lines is represented by a "source line SL", and each of the gate lines is represented by a "gate line GL".

In this case, the source line SL corresponds to a "data signal line", and the gate line GL corresponds to a "scanning signal line". The source driver 13 corresponds to a "data signal line drive circuit", the gate driver 14 corresponds to a "scanning signal line drive circuit", the counter electrode drive circuit 12 corresponds to a "counter electrode voltage supply circuit", and a part of the display control circuit 11 corresponds to a "control line drive circuit".

In FIG. 1, the display control circuit 11 and the counter electrode drive circuit 12 are shown to be independent of the source driver 13 and the gate driver 14. However, in the drivers, the display control circuit 11 and the counter electrode drive circuit 12 may be included.

In the embodiment, as signal lines that drive the pixel circuits 2, in addition to the source line SL and the gate line GL described above, a reference line REF, a selecting line SEL, an auxiliary capacitive line CSL, a voltage supply line VSL, and a boost line BST are included.

Figure 3:
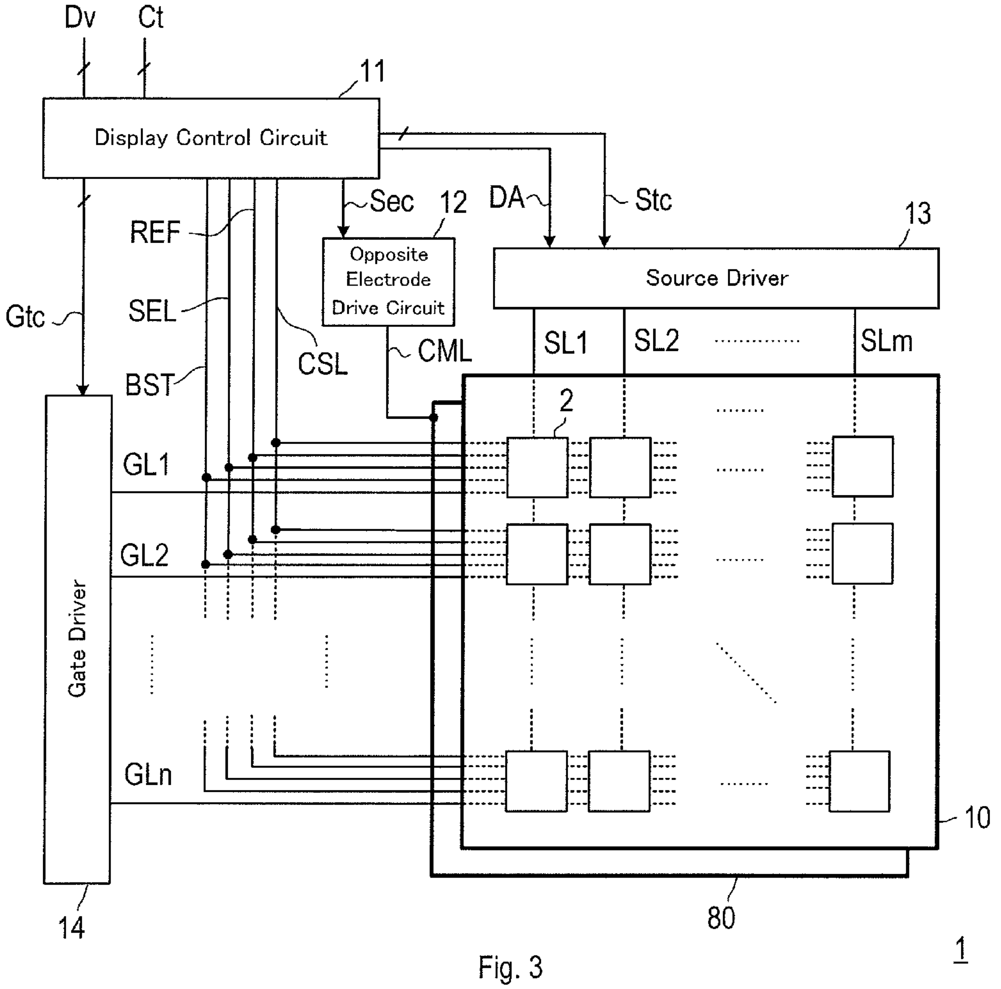
FIG. 3 is a block diagram showing an example of the schematic configuration of the display device according to the present invention.

A power supply line VSL can be arranged as an independent signal line as shown in FIG. 1, and can be also used as the auxiliary capacitive line CSL or the source line SL. In the configuration in FIG. 1, a configuration in which the voltage supply line VSL is also used as the auxiliary capacitive line CSL or the source line SL is shown in FIG. 3. As shown in FIG. 3, the voltage supply line VSL is also used as the auxiliary capacitive line CSL or the source line SL to make it possible to reduce the number of signal lines to be arranged on the active matrix substrate 10 and to improve an aperture ratio of each pixel.

The reference line REF, the selecting line SEL, and the boost line BST correspond to a "first control line", a "second control line", and a "third control line", and are driven by the display control circuit 11. The auxiliary capacitive line CSL corresponds to a "fourth control line", and is driven by the display control circuit 11 for example.

In FIG. 1 and FIG. 3, the reference line REF, the selecting line SEL, the boost line BST, and the auxiliary capacitive line CSL are arranged for each row to extend in the row direction, and wires of the rows are connected to each other at a peripheral portion of the pixel circuit array. However, the wires of the rows are independently driven, and a common voltage may be able to be applied depending on operating modes. Depending on a type of a circuit configuration of the pixel circuit 2 (will be described later), some or all of the reference lines REF, the selecting lines SEL, and the auxiliary capacitive lines CSL can also be arranged for each column to extend in the column direction. Basically, the reference line REF, the selecting line SEL, the boost line BST, and the auxiliary capacitive line CSL are used in common in the plurality of pixel circuits 2.

The display control circuit 11 is a circuit that controls writing actions in a normal display mode and an always-on display mode (will be described later) and a self-refresh action in the always-on display mode.

In the writing action, the display control circuit 11 receives a data signal Dv representing an image to be displayed and a timing signal Ct from an external signal source, and, based on the signals Dv and Ct, as signals to display an image on the display element unit 21 (see FIG. 4) of the pixel circuit array, generates a digital image signal DA and a data-side timing control signal Stc given to the source driver 13, a scanning-side timing control signal Gtc given to the gate driver 14, a counter voltage control signal Sec given to the counter electrode drive circuit 12, and signal voltages applied to the reference line REF, the selecting line SEL, the auxiliary capacitive line CSL, the boost line BST, and the voltage supply line VSL, respectively.

The source driver 13 is a circuit that applies a source signal having a predetermined voltage amplitude at a predetermined timing to the source lines SL under the control of the display control circuit 11 in the writing action and the self-refresh action.

In the writing action, the source driver 13, based on the digital image signal DA and the data-side timing control signal Stc, generates a voltage matched with a voltage level of a counter voltage Vcom corresponding to a pixel value of one display line represented by the digital image signal DA as source signals Sc1, Sc2, . . . , Scm every one-horizontal period (to be also referred to as a "1H period"). The voltage is a multi-tone analog voltage in the normal display mode, and is a two-tone (binary) voltage in the always-on display mode. The source signals are applied to the source lines SL1, SL2, . . . , SLm, respectively.

In the self-refresh action, the source driver 13 performs the same voltage application to all the source lines SL connected to the target pixel circuit 2 at the same timing under the control of the display control circuit 11 (will be described in detail later).

The gate driver 14 is a circuit that applies a gate signal having a predetermined voltage amplitude to the gate lines GL at a predetermined timing under the control of the display control circuit 11 in the writing action and the self-refresh action. The gate driver 14, like the pixel circuit 2, may be formed on the active matrix substrate 10.

In the writing action, the gate driver 14 sequentially selects the gate lines GL1, GL2, . . . , GLn every almost one-horizontal period in each frame period of the digital image signal DA on the basis of the scanning-side timing control signal Gtc to write the source signals Sc1, Sc2, . . . , Scm in the pixel circuits 2.

In the self-refresh action, the gate driver 14 performs the same voltage application at the same timing to all the gate lines GL connected to the target pixel circuit 2 under the control of the display control circuit 11 (will be described in detail later).

The counter electrode drive circuit 12 applies the counter voltage Vcom to the counter electrode 80 through a counter electrode wire CML. In the embodiment, the counter electrode drive circuit 12 outputs the counter voltage Vcom in the normal display mode and the always-on display mode such that the level of the counter voltage Vcom is alternately switched between a predetermined high level (5 V) and a predetermined low level (0 V). In this manner, it is called "counter AC drive" that the counter electrode 80 is driven while switching the counter voltage Vcom between the high level and the low level.

The "counter AC drive" in the normal display mode switches the counter voltage Vcom between the high level and the low level every one-horizontal period and 1-frame period. That is, in a certain 1-frame period, in two sequential horizontal periods, a voltage polarity across the counter electrode 80 and the pixel electrode 20 changes. Even in the same one-horizontal period, in two sequential frame periods, a voltage polarity across the counter electrode 80 and the pixel electrode 20 changes.

On the other hand, in the always-on display mode, although the same voltage level is maintained in a 1-frame period, the voltage polarity across the counter electrode 80 and the pixel electrode 20 changes in two sequential writing actions.

When a voltage having the same polarity is continuously applied across the counter electrode 80 and the pixel electrode 20, a display screen burns in (surface burn-in). For this reason, the polarity inverting action is required. However, when the "counter AC drive" is employed, an amplitude of a voltage applied to the pixel electrode 20 in the polarity inverting action can be reduced.

<<Pixel Circuit>>

A configuration of the pixel circuit 2 will be described below with reference to FIGS. 4 to 16.

Figure 4:
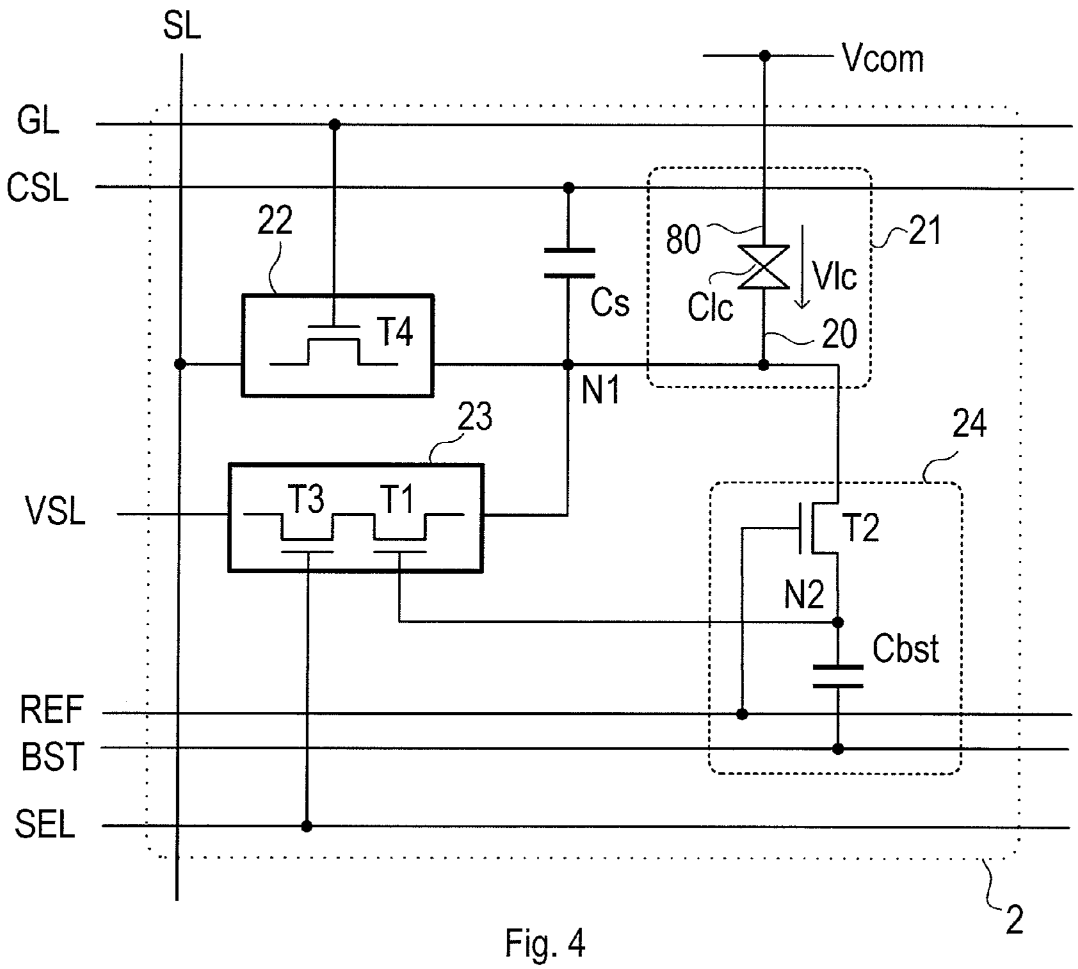
FIG. 4 is a circuit diagram showing a basic circuit configuration of a pixel circuit.

FIG. 4 shows a basic circuit configuration of the pixel circuit 2 of the present invention. The pixel circuit 2, being common in all circuit configurations, includes a display element unit 21 including the unit liquid crystal display element Clc, a first switch circuit 22, a second switch circuit 23, a control circuit 24, and an auxiliary capacitor element Cs. The auxiliary capacitor element Cs corresponds to a "second capacitor element".

The pixel electrode 20 is connected to one terminals of the first switch circuit 22, the second switch circuit 23, and the control circuit 24 to form an internal node N1. The internal node N1 holds a voltage of pixel data supplied from the source line SL in the writing action.

The auxiliary capacitor element Cs has one terminal connected to the internal node N1 and the other terminal connected to the auxiliary capacitive line CSL. The auxiliary capacitor element Cs is additionally arranged to make it possible to cause the internal node N1 to stably hold the voltage of the pixel data.

The first switch circuit 22 has one terminal on which the internal node N1 is not configured and that is connected to the source line SL. The first switch circuit 22 includes a transistor T4 that functions as a switch element. The transistor T4 means the transistor having a control terminal connected to the gate line and corresponds to a "fourth transistor". In at least an off state of the transistor T4, the first switch circuit 22 is set to an off state, and conduction between the source line SL and the internal node N1 is interrupted.

The second switch circuit 23 has one terminal on which the internal node N1 is not configured and that is connected to the voltage supply line VSL. The second switch circuit 23 includes a series circuit of a transistor T1 and a transistor T3. The transistor T1 means a transistor having a control terminal that is connected to an output node N2 of the control circuit 24, and corresponds to a "first transistor element". The transistor T3 means a transistor having a control terminal that is connected to the selecting line SEL, and corresponds to a "third transistor element". When both the transistor T1 and the transistor T3 are turned on, a second switch circuit 23 is set to an on state, and a conducting state between the voltage supply line VSL and the internal node N1 is set.

The control circuit 24 includes a series circuit of the transistor T2 and a boost capacitor element Cbst. A first terminal of the transistor T2 is connected to the internal node N1, and a control terminal thereof is connected to the reference line REF. The second terminal of the transistor T2 is connected to the first terminal of the boost capacitor element Cbst and the control terminal of the transistor T1 to form an output node N2. The second terminal of the boost capacitor element Cbst, as shown in FIG. 4, is connected to the boost line BST.

One end of the auxiliary capacitor element Cs and one end of the liquid crystal capacitor element Clc are connected to the internal node N1. In order to avoid reference numerals from being complicated, an electrostatic capacity (referred to as an "auxiliary capacity") of the auxiliary capacitor element is expressed by Cs, and an electrostatic capacity (referred to as a "liquid crystal capacity") of a liquid crystal capacitor element is expressed by Clc. At this time, a full capacity being parasitic in the internal node N1, i.e., a pixel capacity Cp in which pixel data is to be written and held is approximately expressed by a sum of the liquid crystal capacity Clc and the auxiliary capacity Cs ($Cp \cong Clc+Cs$).

At this time, the boost capacitor element Cbst is set so as to establish $Cbst \ll Cp$ when the electrostatic capacity (referred to as a "boost capacity") of the element is described as Cbst.

The output node N2 holds a voltage depending on a voltage level of the internal node N1 when the transistor T2 is turned on, and holds the initial hold voltage when the transistor T2 is turned off even though the voltage level of the internal node N1 changes. Depending on the hold voltage of the output node N2, the transistor T1 of the second switch circuit 23 is on/off-controlled.

All the transistors T1 to T4 of four types are thin film transistors such as polysilicon TFTs or amorphous silicon TFTs formed on the active matrix substrate 10. One of the first and second terminals corresponds to a drain electrode, the other corresponds to a source electrode, and the control terminal corresponds to a gate electrode. Furthermore, each of the transistors T1 to T4 may be configured by a single transistor element. When a request to suppress a leakage current in an off state is strong, the plurality of transistors may be connected in series with each other to share the control terminal. In an explanation of action of the pixel circuit 2, as all the transistors T1 to T4, N-channel type polysilicon TFTs each having a threshold voltage of about 2 V are supposed.

In fact, threshold voltages of transistors are expected to fluctuate depending on process steps. The configuration of the present invention has one characteristic feature in which, especially when the threshold voltage of the transistor T1 decreases, a problem occurring in a self-refresh action (will be described later) can be solved. For this reason, a case in which the threshold voltage of the transistor T1 is sufficiently lower than 2 V will be also arbitrarily described.

The pixel circuit 2, as will be described later, may have various circuit configurations. However, the circuit configurations may be patterned as follows.

1) With respect to the configuration of the first switch circuit 22, two patterns, i.e., a pattern in which the first switch circuit 22 is configured by only the transistor T4 and a pattern in which the first switch circuit 22 is configured by a series circuit of the transistor T4 and another transistor element are possible. In the latter, as another transistor element configuring the series circuit, the transistor T3 in the second switch circuit 23 can be used, or another transistor element having the control terminal connected to the control terminal of the transistor T3 in the second switch circuit 23 can also be used.

2) With respect to the voltage supply line VSL, three patterns, i.e., a pattern in which the voltage supply line VSL is an independent signal line, a pattern in which the voltage supply line VSL also serves as the auxiliary capacitive line CSL, and a pattern in which the voltage supply line VSL also servers as the source line SL are possible.

More specifically, on the basis of the 1) to 2), the pixel circuits 2 are classified into six types with respect to combinations of the configuration of the first switch circuit 22 and the configuration of the voltage supply line VSL.

More specifically, cases in each of which the first switch circuit 22 is configured by only the transistor T4 are defined as first to third types, and cases in each of which the first switch circuit 22 is configured by a series circuit of the transistor T4 and another transistor element are defined as fourth to sixth types. Of the types, each of the first and fourth types has a configuration in which the voltage supply line VSL is configured by an independent signal line, each of the second and fifth types has a configuration in which the voltage supply line VSL also serves as the auxiliary capacitive line CSL, and each of the third and sixth types has a configuration in which the voltage supply line VSL also serves as the source line SL.

Even pixel circuits of the same type belonging to the same group may have a plurality of modified patterns depending on a change of an arrangement position of the transistor T3 in the second switch circuit 23.

(First to Third Types)

The types of the pixel circuits in each of which the first switch circuit 22 is configured by only the transistor T4 will be described below.

Figure 5:
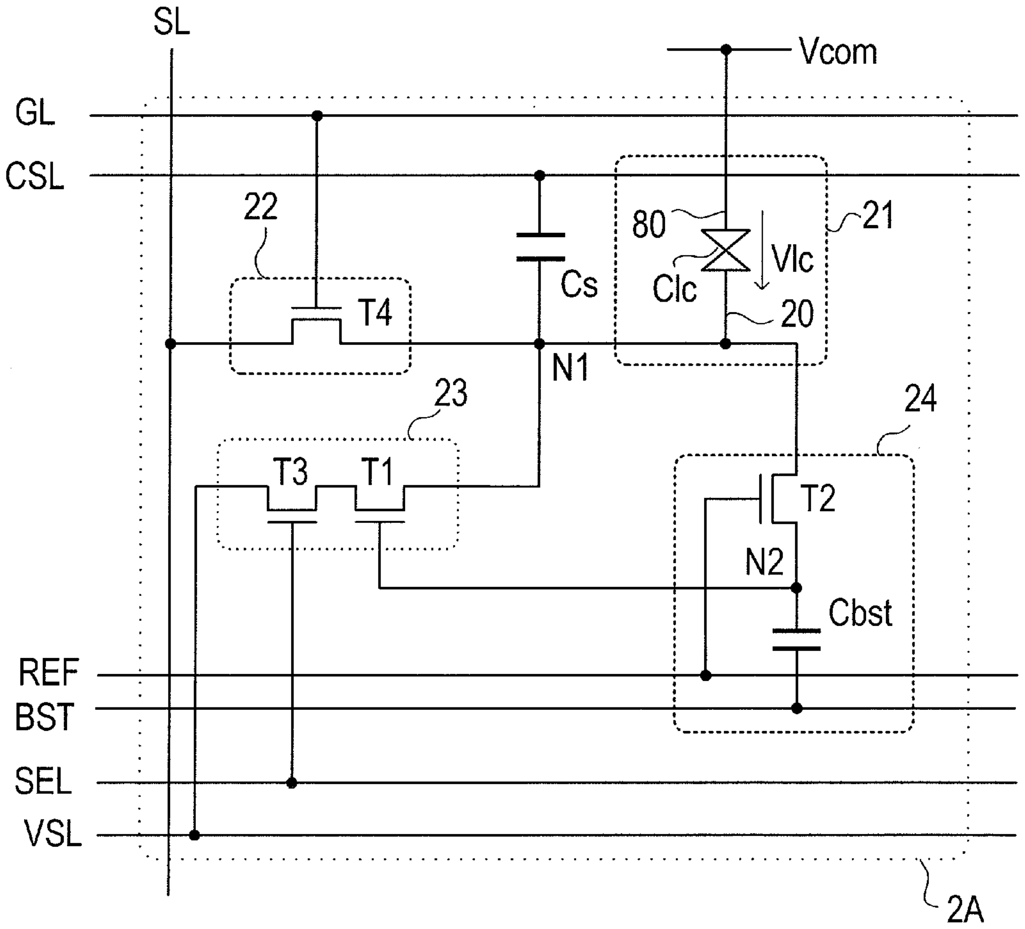
FIG. 5 is a circuit diagram showing a circuit configuration of a first type.

In the pixel circuit 2A of the first type shown in FIG. 5, the first switch circuit 22 is configured by only the transistor T4, and the voltage supply line VSL is configured by an independent signal line. The reference line REF and the voltage supply line VSL extend in a horizontal direction (row direction) in parallel with the gate line GL, for example. However, the reference line REF may extend in a vertical direction (column direction) in parallel with the source line SL.

In this case, in FIG. 5, the second switch circuit 23 is configured by a series circuit of the transistor T1 and the transistor T3 and has, as an example, a configuration in which the first terminal of the transistor T1 is connected to the internal node N1, the second terminal of the transistor T1 is connected to the first terminal of the transistor T3, and the second terminal of the transistor T3 is connected to the source line SL. However, the arrangements of the transistor T1 and the transistor T3 of the series circuit may be replaced with each other, and a circuit configuration in which the transistor T1 is interposed between the two transistors T3 may be used. The two modified circuit configurations are shown in FIG. 6 and FIG. 7.

Figure 8:
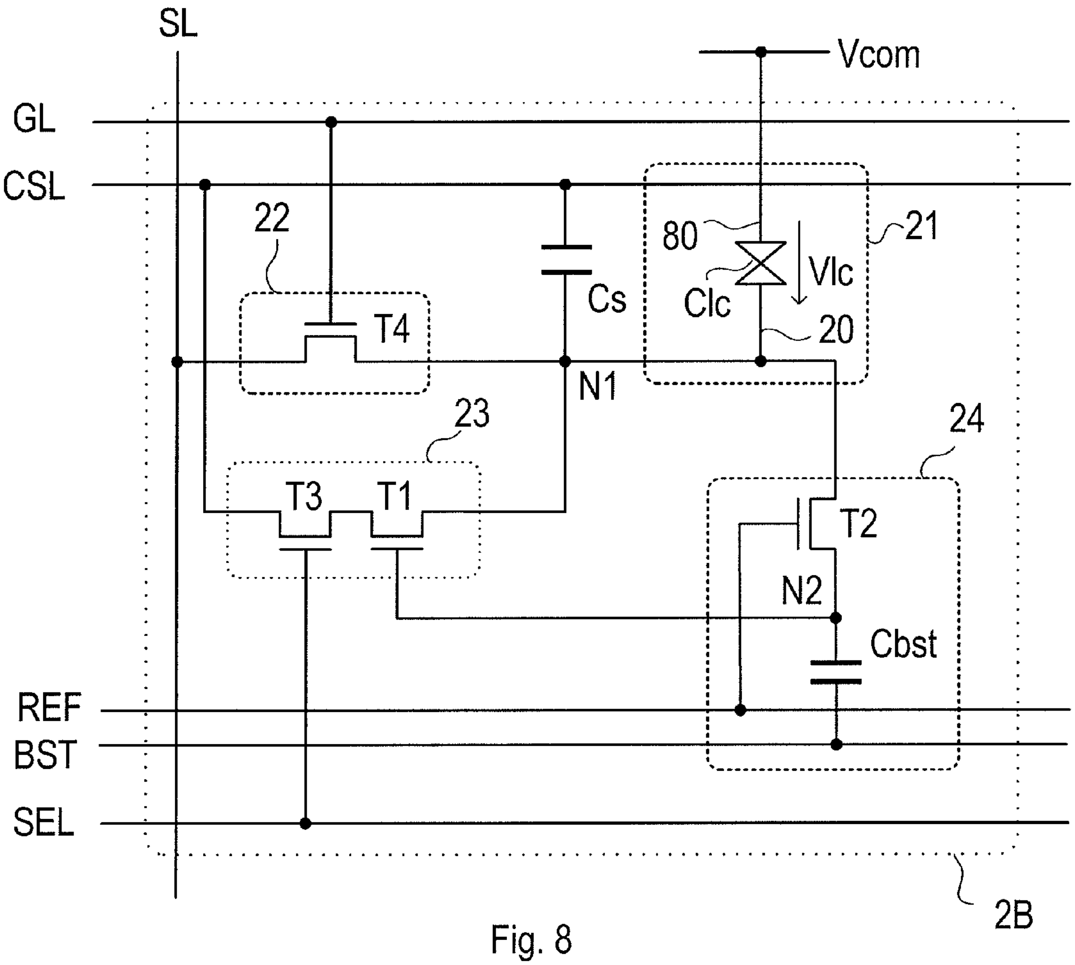
FIG. 8 is a circuit diagram showing a circuit configuration of a second type.

In the pixel circuit 2B of the second type shown in FIG. 8, the first switch circuit 22 is configured by only the transistor T4, and the voltage supply line VSL also serves as the auxiliary capacitive line CSL. The auxiliary capacitive line CSL extends in a horizontal direction (row direction) in parallel with the gate line GL, for example. However, the auxiliary capacitive line CSL may extend in a vertical direction (column direction) in parallel with the source line SL.

Figure 9:
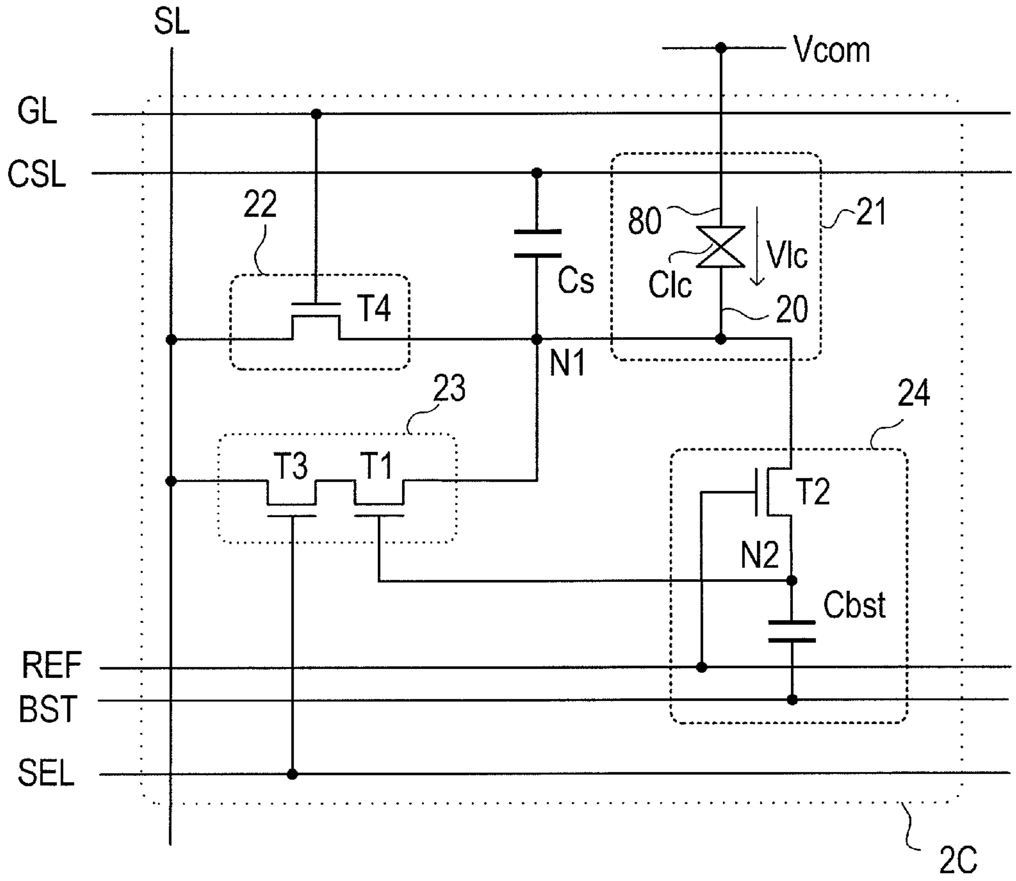
FIG. 9 is a circuit diagram showing a circuit configuration of a third type.

In the pixel circuit 2C of the third type shown in FIG. 9, the first switch circuit 22 is configured by only the transistor T4, and the voltage supply line VSL also serves as the source line SL.

Figure 6:
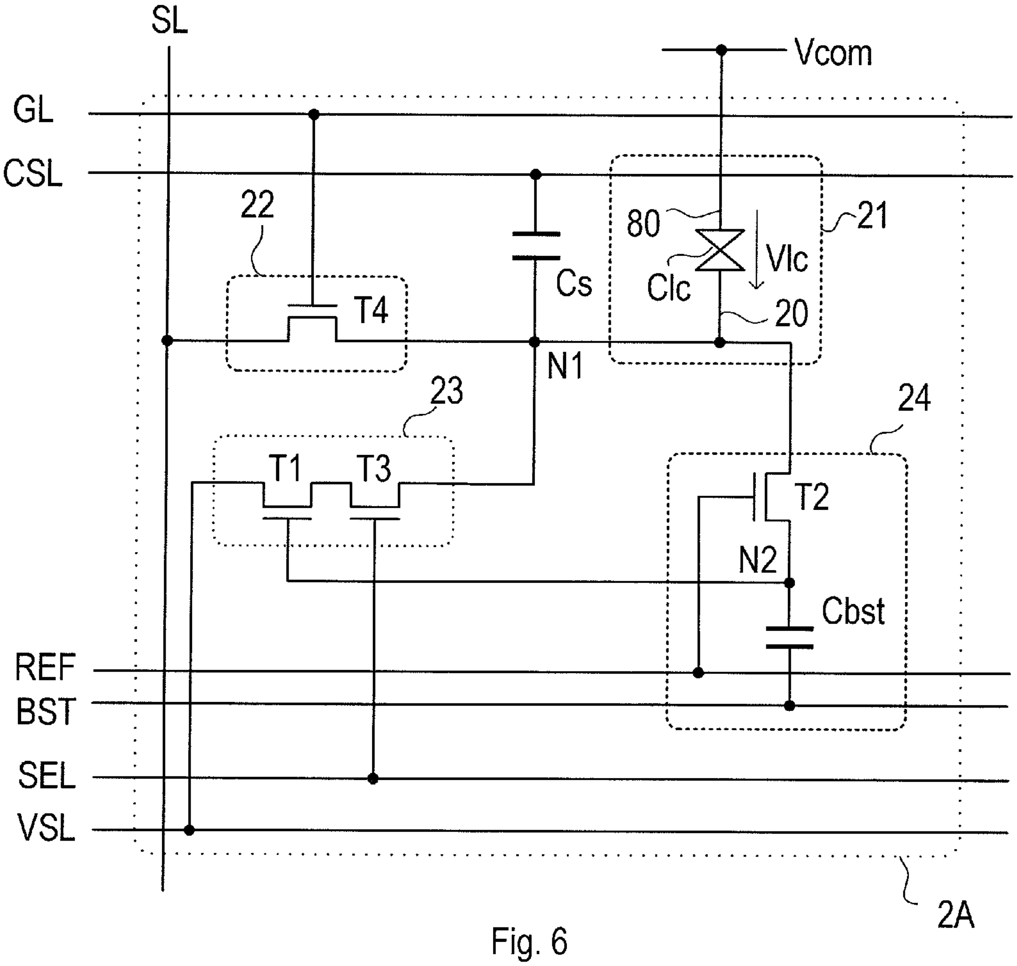
FIG. 6 is a circuit diagram showing another circuit configuration of the first type.
Figure 7:
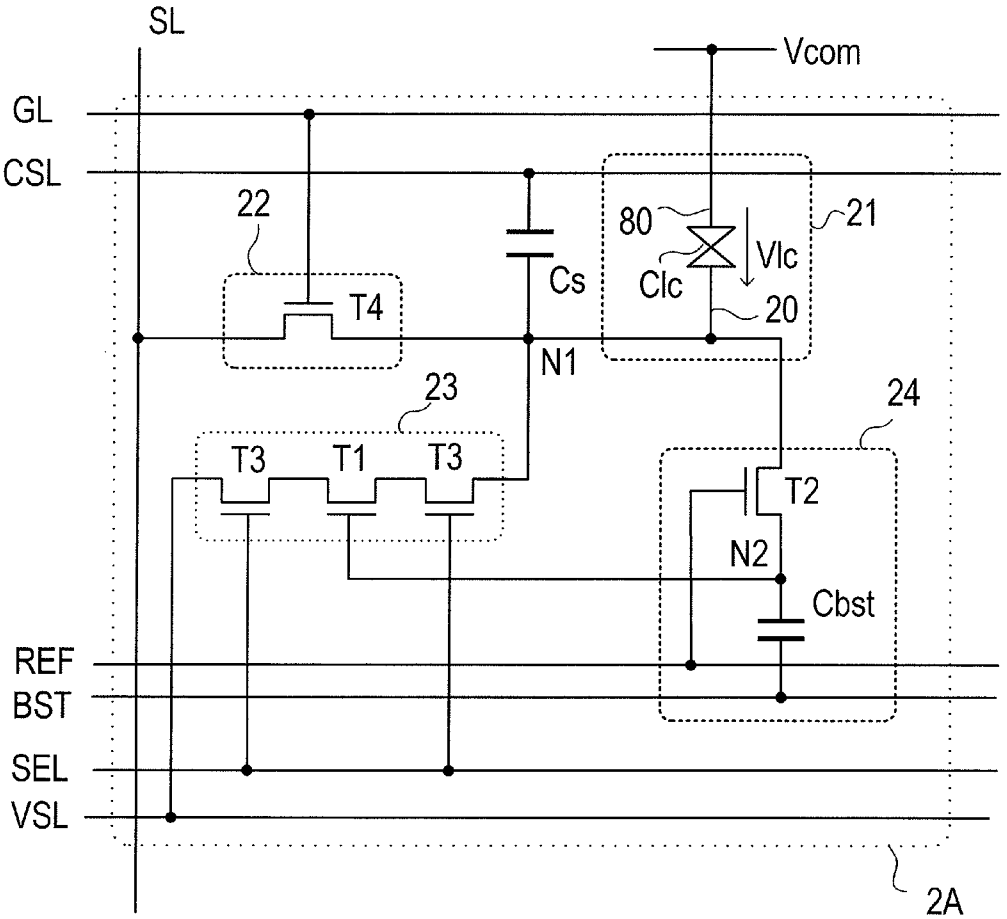
FIG. 7 is a circuit diagram showing another circuit configuration of the first type.

Even in the second and third types, as in the first type, as shown in FIG. 6 or 7, a modified circuit depending on the configuration of the second switch circuit 23 can be realized.

(Fourth to Sixth Types)

The types of the pixel circuits in each of which the first switch circuit 22 is configured by a series circuit of the transistor T4 and another transistor element will be described below.

Figure 10:
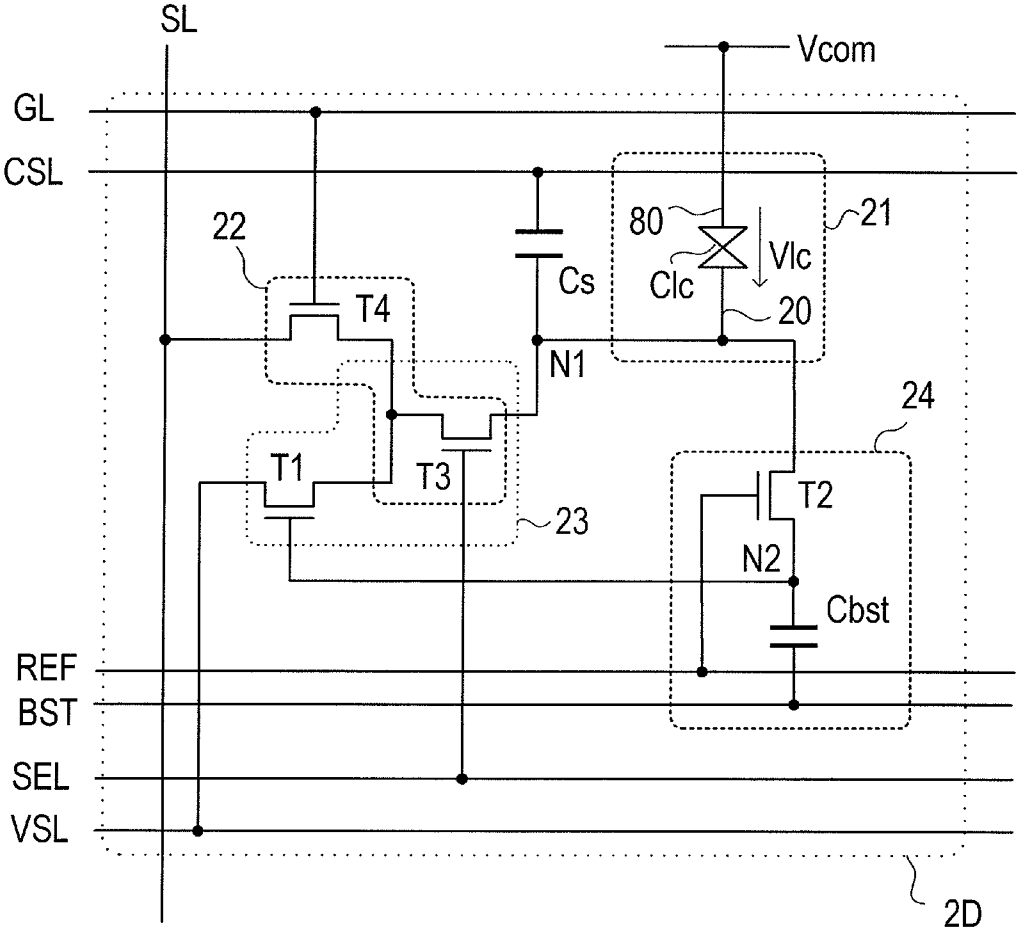
FIG. 10 is a circuit diagram showing a circuit configuration of a fourth type.

The pixel circuit 2D of the fourth type shown in FIG. 10 is similar to the pixel circuit 2A of the first type shown in FIG. 6 except that the first switch circuit 22 is configured by a series circuit of the transistor T4 and another transistor element.

In FIG. 10, as the transistor element configuring the first switch circuit 22 except for the transistor T4, a transistor in the second switch circuit 23 is also used. More specifically, the first switch circuit 22 is configured by a series circuit of the transistor T4 and the transistor T3, and the second switch circuit 23 is configured by a series circuit of the transistor T1 and the transistor T3. The first terminal of the transistor T3 is connected to the internal node N1, the second terminal of the transistor T3 is connected to the first terminal of the transistor T1 and the first terminal of the transistor T4, the second terminal of the transistor T4 is connected to the source line SL, and the second terminal of the transistor T1 is connected to the voltage supply line VSL.

More specifically, in the pixel circuit 2D of the fourth type, the on/off of the first switch circuit 22 is controlled by, in addition to the gate line GL, the selecting line SEL.

Figure 11:
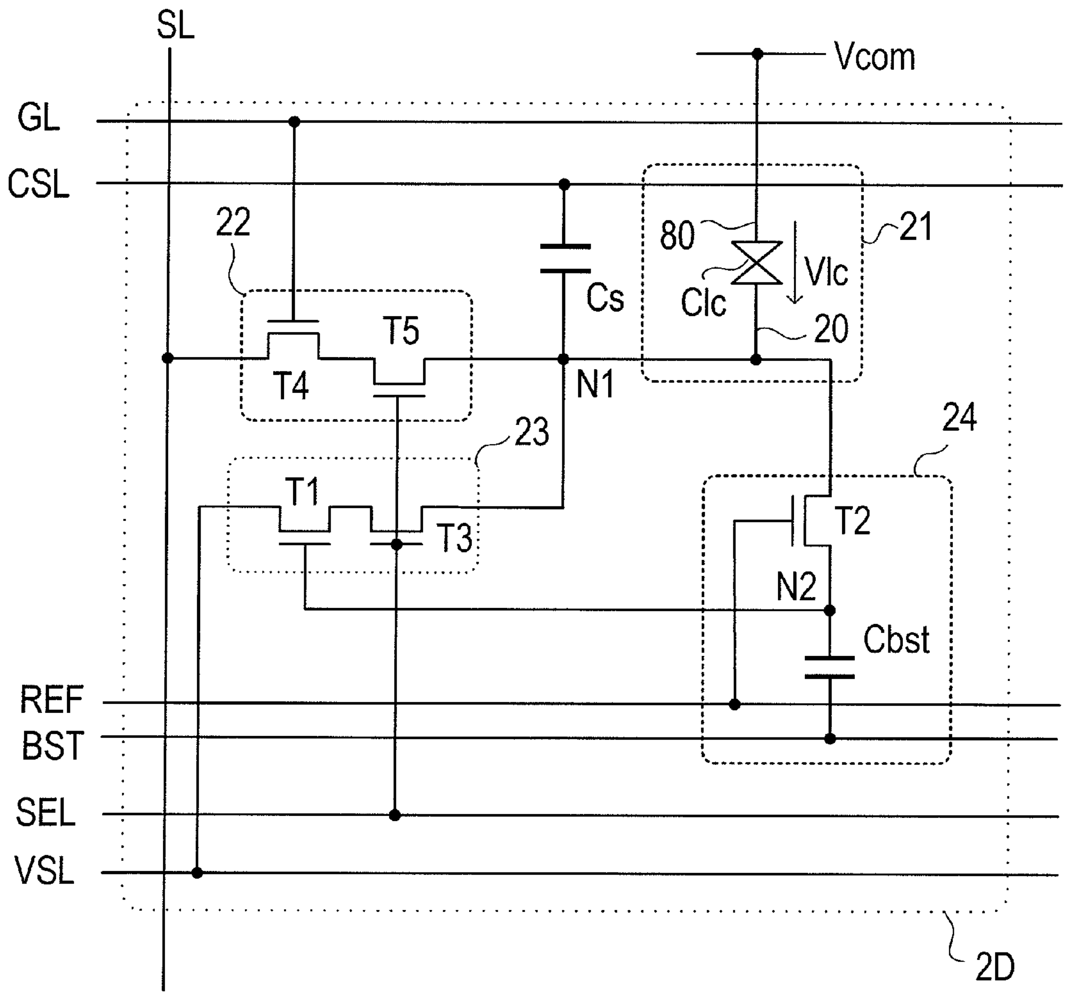
FIG. 11 is a circuit diagram showing another circuit configuration of the fourth type.

As a modification of the fourth type, as shown in FIG. 11, a configuration using, as the transistor element configuring the first switch circuit 22 except for the transistor T4, the transistor T5 having the control terminal connected to the control terminal of the transistor T3 in the second switch circuit 23 can also be realized. The transistor T5 corresponds to a "fifth transistor element".

In the pixel circuit 2D shown in FIG. 11, since the control terminals of the transistor T5 and the transistor T3 are connected to each other, the transistor T5 is on/off-controlled by the selecting line SEL like the transistor T3. Since the transistor element configuring the first switch circuit 22 except for the transistor T4 is on/off-controlled by the selecting line SEL, the configuration is similar to the configuration shown in FIG. 10.

In the fourth type, the transistor T3 is shared by the first switch circuit 22 and the second switch circuit 23. For this reason, as shown in FIG. 10, the transistor T3 in the second switch circuit 23 must be arranged on the internal node N1 side, and the transistor T1 must be arranged on the voltage supply line VSL side. More specifically, a positional relationship between the transistors T1 and T3 cannot be set as shown in FIG. 5. On the other hand, as shown in FIG. 7, the transistor T1 can be sandwiched by the transistors T3. A modification obtained in this case is shown in FIG. 12.

Figure 13:
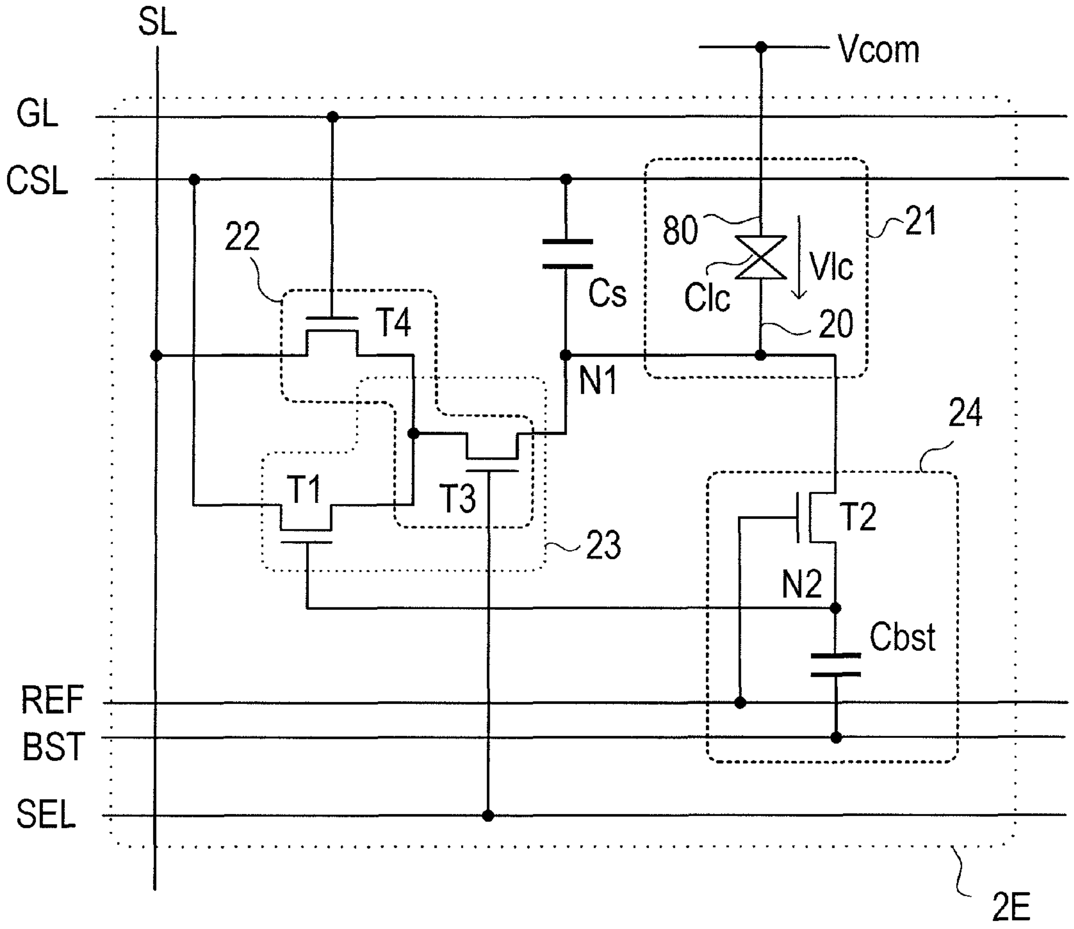
FIG. 13 is a circuit diagram showing a circuit configuration of a fifth type.

A pixel circuit 2E of a fifth type shown in FIG. 13 is obtained by modifying the configuration of the pixel circuit 2B of the second type such that the first switch circuit 22 is configured by a series circuit of the transistor T4 and the transistor T3. As in the pixel circuit 2D of the fourth type shown in FIG. 10, since the transistor T3 must be arranged on the internal node N1 side in the second switch circuit 23, the arrangements of the transistors T1 and T3 are replaced with each other compared to FIG. 8.

Figure 14:
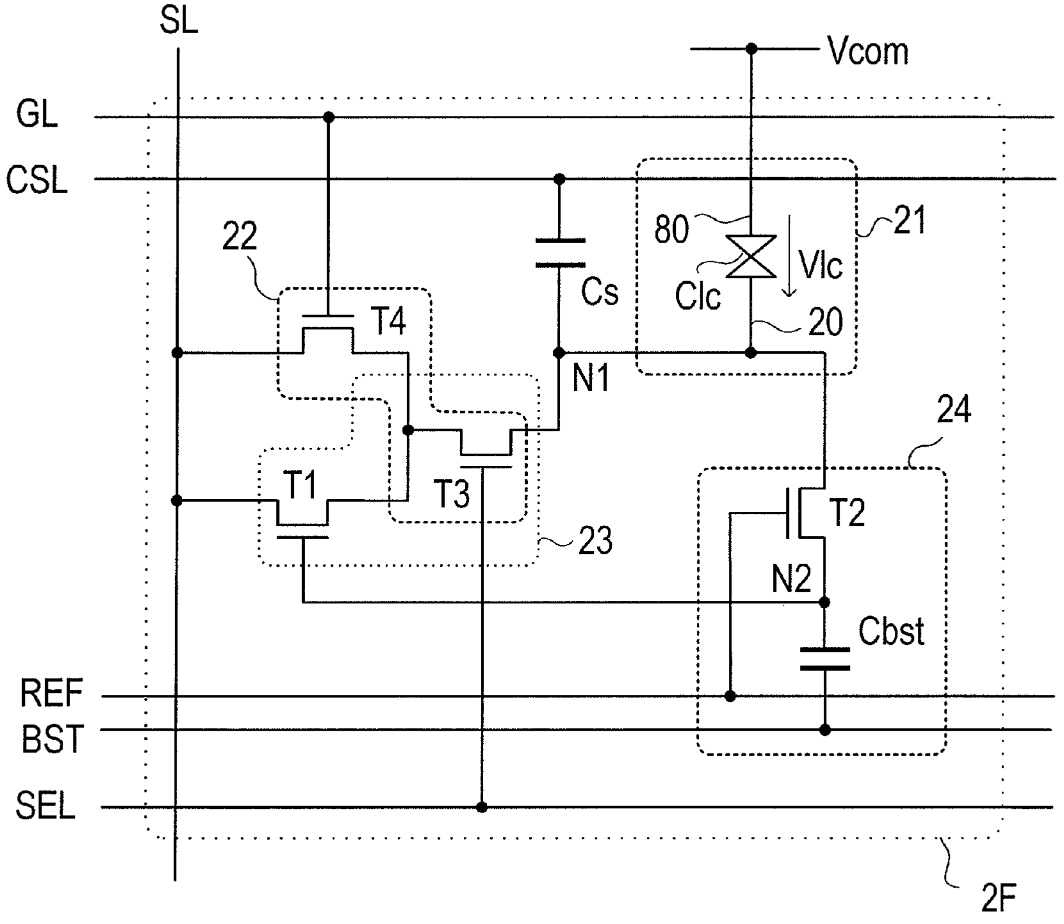
FIG. 14 is a circuit diagram showing a circuit configuration of a sixth type.
Figure 15:
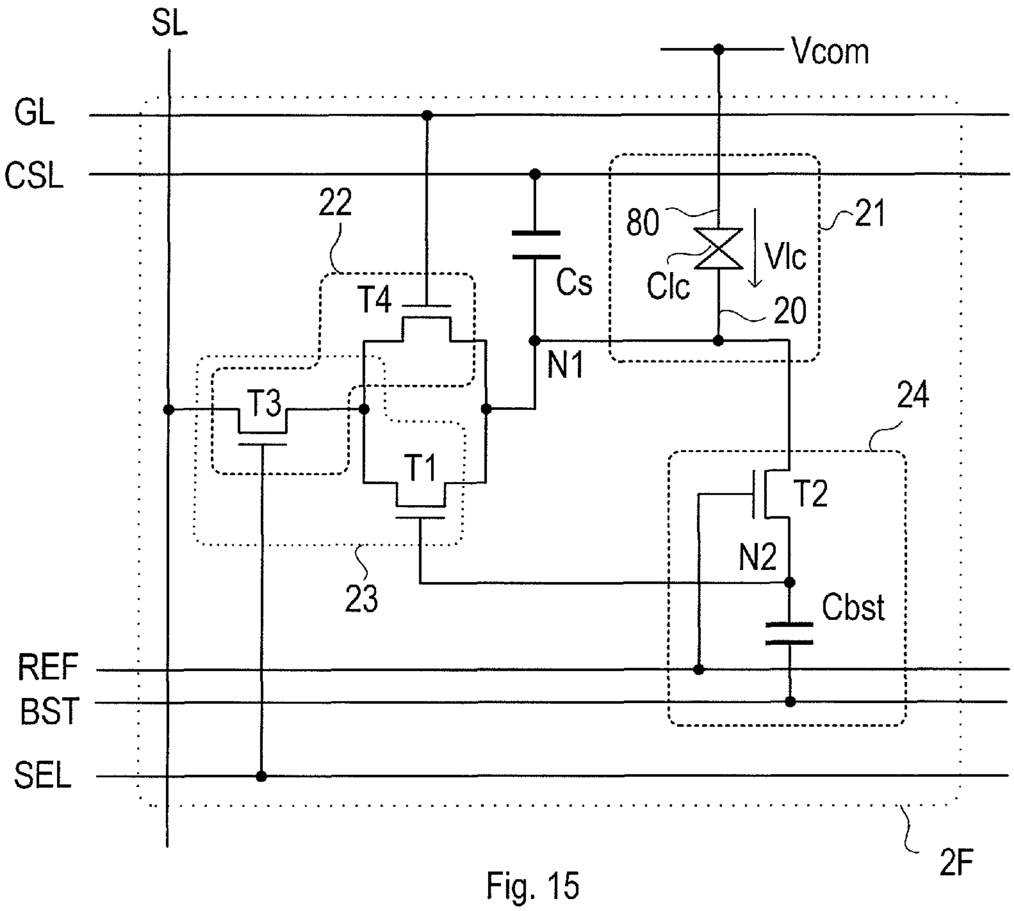
FIG. 15 is a circuit diagram showing a circuit configuration of the sixth type.
Figure 16:
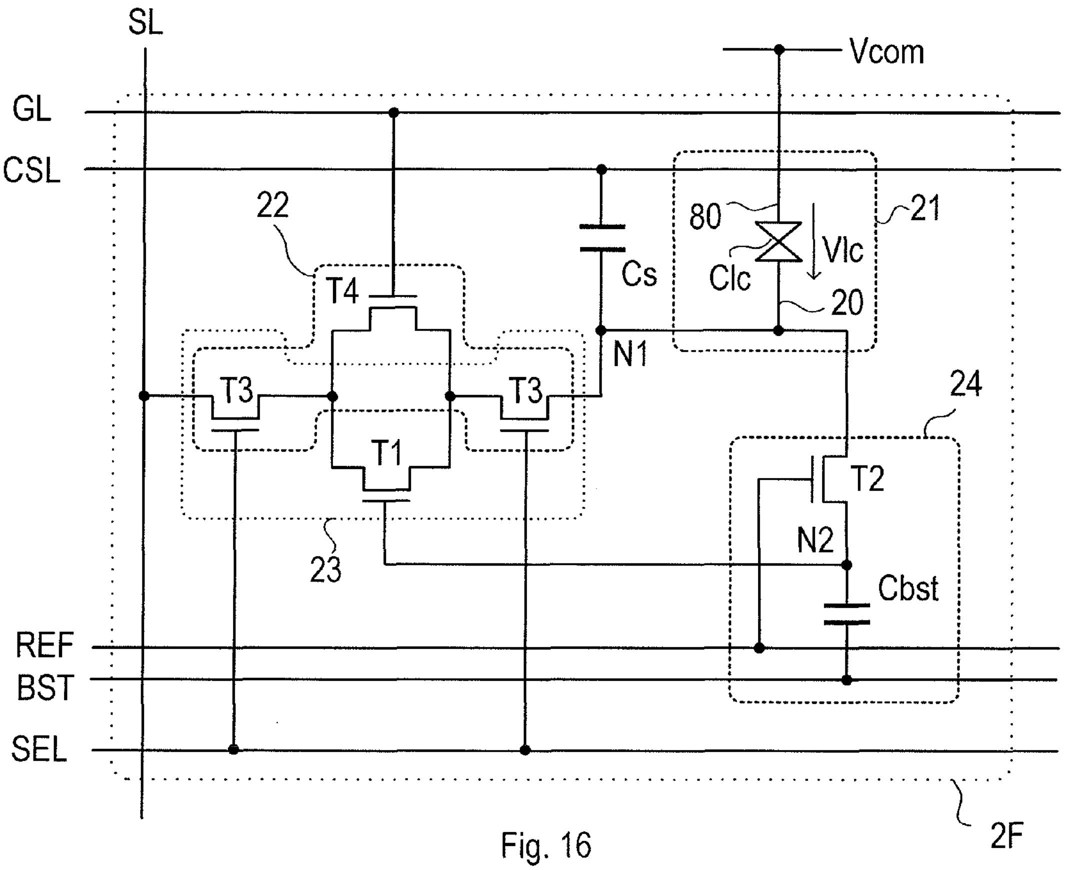
FIG. 16 is a circuit diagram showing a circuit configuration of the sixth type.

A pixel circuit 2F of a sixth type shown in FIGS. 14 and 15 is obtained by modifying the configuration of the pixel circuit 2C of the third type such that the first switch circuit 22 is configured by a series circuit of the transistor T4 and the transistor T3. In the sixth type, since each of the first switch circuit 22 and the second switch circuit 23 has one end connected to the internal node N1 and the other end connected to the source line SL, as shown in FIG. 14 and FIG. 15, the arrangements of the transistor elements T1 and T3 in the second switch circuit 23 can be replaced with each other. Furthermore, a modified circuit as shown in FIG. 16 can also be used.

Figure 12:
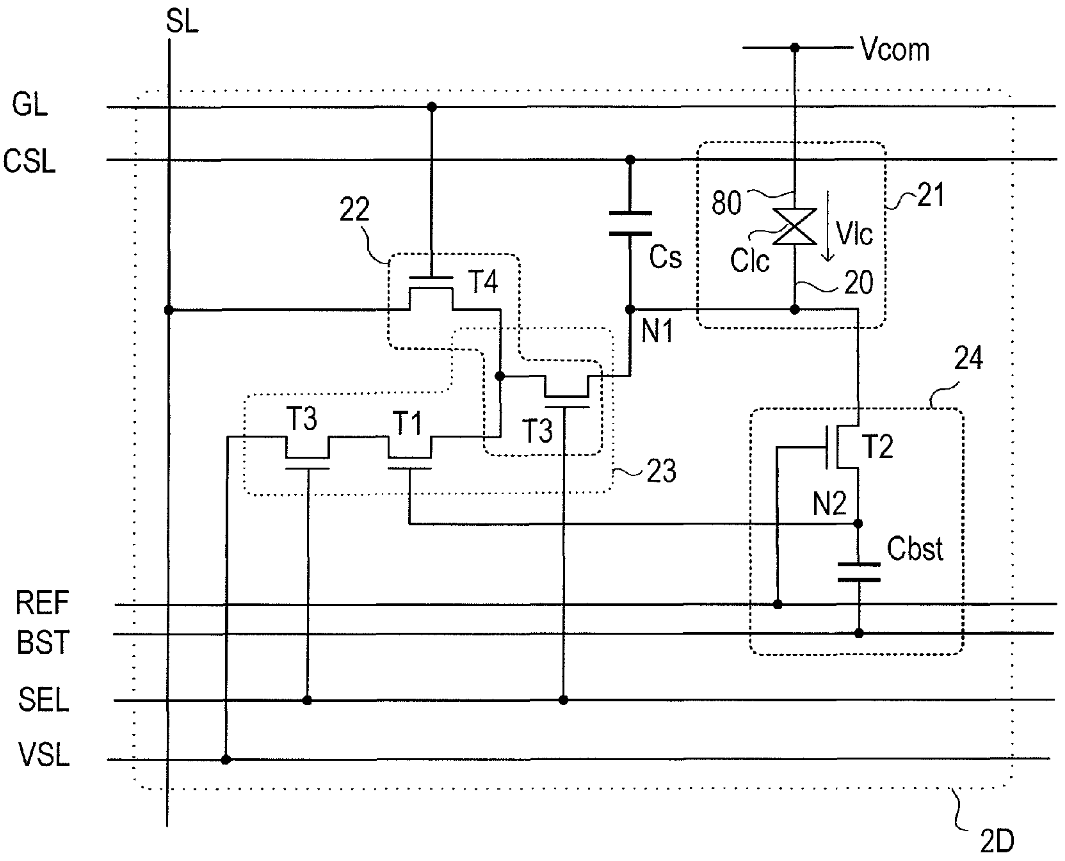
FIG. 12 is a circuit diagram showing still another circuit configuration of the fourth type.

Also in the fifth to sixth types, modified circuits can be realized in the same manner as the modified circuits of the fourth type shown in FIGS. 11 and 12.

Second Embodiment

In the second embodiment, self-refresh actions performed by the pixel circuits of the first to sixth types will be described with reference to the accompanying drawings.

The self-refresh action is an action in an always-on display mode, and is an action in which the first switch circuit 22, the second switch circuit 23, and the control circuit 24 are operated by a predetermined sequence in the plurality of pixel circuits 2 to recover potentials of the pixel electrodes 20 (or potentials of the internal nodes N1) to potentials written by an immediately previous writing action at the same time in a lump. The self-refresh action is an action being unique to the present invention and performed by the pixel circuits. The self-refresh action can achieve a very low power consumption in comparison with an "external refresh action" that performs a normal writing action as in the conventional technique to recover the potential of the pixel electrode 20. The term "the same time" in the phrase "at the same time in a lump" is "the same time" having a time range of a series of self-refresh actions.

In the conventional technique, the writing action is performed to perform an action (external polarity inverting action) that inverts only a polarity of a liquid crystal voltage Vcl applied across the pixel electrode 20 and the counter electrode 80 while maintaining an absolute value of the liquid crystal voltage Vcl. When the external polarity inverting action is performed, the polarity is inverted, and the absolute value of the liquid crystal voltage Vcl is also updated to an absolute value in an immediately previous writing state. More specifically, polarity inversion and refreshing are simultaneously performed. It is not general that a refresh action is executed by the writing action in order to update only the absolute value of the liquid crystal voltage Vcl without inverting the polarity. However, in the following explanation, for descriptive convenience, in terms of comparison with the self-refresh action, it is assumed that such a refresh action is referred to as an "external refresh action".

Also, when the refresh action is executed by the external polarity inverting action, the writing action is still performed. More specifically, in comparison with the conventional method, a very low power consumption can also be achieved by the self-refresh action according to the embodiment.

Voltages are applied to all the gate lines GL, the source lines SL, the selecting lines SEL, the reference lines REF, the auxiliary capacitive lines CSL, and the boost lines BST that are connected to the pixel circuit 2 targeted by the self-refresh action, and the counter electrode 80 at the same timing. When the voltage supply line VSL is arranged as an independent signal line, voltage application to the voltage supply line VSL is performed at the same timing. At the same timing, the same voltage is applied to all the gate lines GL, the same voltage is applied to all the reference lines REF, the same voltage is applied to all the auxiliary capacitive lines CSL, and the same voltage is applied to all the boost lines BST. When the voltage supply lines VSL are arranged as independent signal lines, the same voltage is applied to all the voltage supply lines VSL. The timing control of the voltage applications is performed by the display control circuit 11, and each of the voltage applications is performed by the display control circuit 11, the counter electrode drive circuit 12, the source driver 13, and the gate driver 14.

In the always-on display mode according to the embodiment, since two-tone (binary) pixel data is held in units of pixel circuits, a potential VN1 held in the pixel electrode 20 (internal node N1) exhibits two voltage states including a first voltage state and a second voltage state. In the embodiment, like the counter voltage Vcom described above, the first voltage state and the second voltage state will be explained as a high level (5 V) and a low level (0 V), respectively.

In a state immediately previous to the execution of the self-refresh action, it is supposed that a pixel in which the pixel electrode 20 is written with a high-level voltage and a pixel in which the pixel electrode 20 is written with a low-level voltage are mixed. However, according to the self-refresh action of the embodiment, even though the pixel electrode 20 is written with any one of high-level and low-level voltages, a voltage applying process based on the same sequence is performed to make it possible to execute a refresh action to all the pixel circuits. The contents will be described below with reference to a timing chart and a circuit diagram.

In the following description, a case in which a voltage in the first voltage state (high-level voltage) is written in an immediately previous writing action and the high-level voltage is recovered is called a "case H". A case in which the second voltage state (low-level voltage) is written in the immediately previous writing action and the low-level voltage is recovered is called a "case L".

(First Type)

Figure 17:
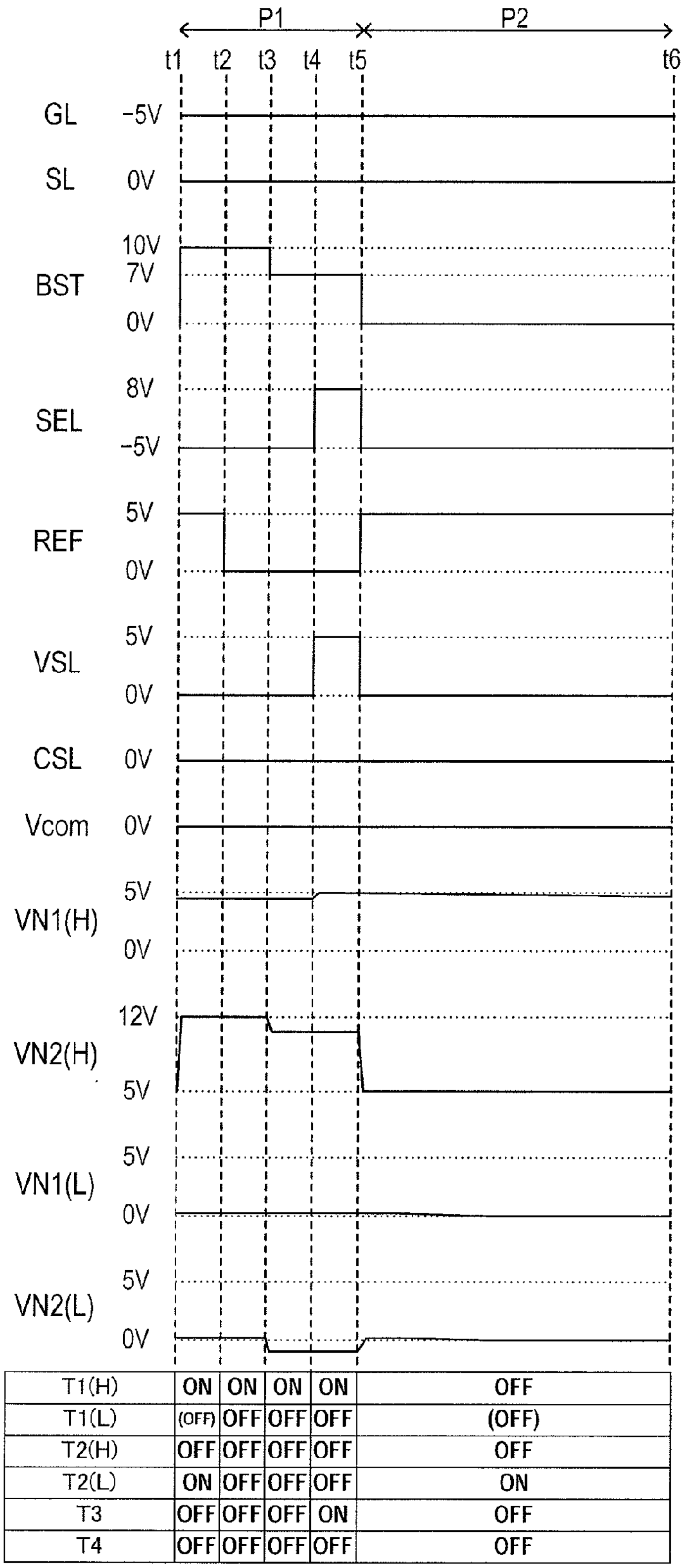
FIG. 17 is a timing chart of self-refresh actions performed by the pixel circuits of the first and fourth types.

FIG. 17 shows a timing chart of a self-refresh action in the pixel circuit 2A of the first type. As shown in FIG. 17, the self-refresh action is divided into two phases P1 and P2 depending on whether a voltage is applied to the boost line BST.

In the following description, time at which application of a high-level voltage (10 V) to the boost line BST is started is defined as t1, time at which an applied voltage to the reference line REF is decreased is defined as t2, time at which an applied voltage to the boost line BST is slightly decreased is defined as t3, time at which application of a high-level voltage to the selecting line SEL is started is defined as t4, and time at which voltage application to the boost line BST is stopped is defined as t5. Time t5 also corresponds to start time of the phase P2.

FIG. 17 shows voltage waveforms of all the gate lines GL, the source lines SL, the selecting lines SEL, the reference lines REF, the auxiliary capacitive lines CSL, the voltage supply lines VSL, and the boost lines BST that are connected to the pixel circuits 2A targeted by the self-refresh action, and a voltage waveform of the counter voltage Vcom. In the embodiment, all the pixel circuits of the pixel circuit array are targeted by the self-refresh action.

Furthermore, in FIG. 17, waveforms showing changes of potentials (pixel voltages) VN1 of the internal nodes N1 and potentials VN2 of the output node N2 in the cases H and L and on/off states of the transistors T1 to T4 are shown. In FIG. 17, a corresponding case is specified by a symbol in parentheses. For example, reference symbol VN1 (H) denotes a waveform showing a change of a potential VN1 in the case H.

It is assumed that, before time (t1) at which the self-refresh action is started, high-level writing is performed in the case H, and low-level writing is performed in the case L.

When a time has elapsed after the writing action is executed, the pixel voltage VN1 of the internal node N1 varies with generation of leakage currents of the transistors in the pixel circuit. In the case H, the VN1 is 5 V immediately after the writing action. However, the value decreases to a value lower than the initial value with time. This is because a leakage current mainly flows toward a low potential (for example, ground line) through a transistor in an off state.

In the case L, immediately after the writing action, the potential VN1 is at 0 V. However, the potential may slightly increase with time. This is because a writing voltage is applied to the source line SL in a writing action in another pixel circuit, for example, to cause a leakage current to flow from the source line SL to the internal node N1 through a transistor in an off state even in a non-selected pixel circuit.

In FIG. 17, at time t1, the VN1 (H) is shown as a potential slightly lower than 5 V, and the VN1 (L) is shown as a potential slightly higher than 0 V. These potentials are set in consideration of the potential variations described above.

Voltage levels applied to the lines in units of phases will be described below.

<<Phase P1>>

In a phase P1 started from time t1, a voltage is applied to a gate line GL1 such that the transistor T4 is completely turned off. The voltage is set to −5 V.

A voltage (5 V) corresponding to the first voltage state is applied to the reference line REF. The voltage is a voltage value such that the transistor T2 is turned off when the voltage state of the internal node N1 is at a high level (case H) and the transistor T2 is turned on when the voltage state is at a low level (case L). An applied voltage to the reference line REF at time t1 corresponds to a "first control voltage".

A voltage (0 V) corresponding to the second voltage state is applied to the source line SL.

The counter voltage Vcom applied to the counter electrode 80 and a voltage applied to the auxiliary capacitive line CSL are set to 0 V. The above description means that the voltage is not limited to 0 V but still kept at a voltage value obtained at a point of time before time t1.

As will be described later in the third embodiment, since the transistor T2 is turned on in the writing action, the nodes N1 and N2 are set to high-level potentials (5 V) in the case H in which high-level writing is performed, and the nodes N1 and N2 are set to low-level potentials (0 V) in the case L in which low-level writing is performed.

Upon completion of the writing action, the transistor T2 is turned off. However, since the node N1 is disconnected from the source line SL, the potentials of the nodes N1 and N2 are still held. More specifically, the potentials of the nodes N1 and N2 immediately before time t1 are approximately 5 V in the case H and are approximately 0 V in the case L. The word "approximately" is a description given in consideration of a variation in potential by generation of a leakage current.

When a voltage of 5 V is applied to the reference line REF at time t1, the nodes N1 and N2 are approximately 5 V in the case H. For this reason, a voltage Vgs between the gate and the source of the transistor T2 approximately becomes 0 V and is lower than a threshold voltage of 2 V, so that the transistor T2 is turned off. In contrast to this, in the case L, since the nodes N1 and N2 configuring the drain or the source of the transistor T2 are approximately set to 0 V, the voltage Vgs between the gate and the source of the transistor T2 approximately becomes 5 V and is higher than a threshold voltage of 2 V, so that the transistor T2 is turned on.

Specifically, in the case H, the transistor T2 needs not be completely in an off state, and electricity needs only be prevented from being conducted at least from the node N2 to the node N1.

To the boost line BST, a high-level voltage is applied such that the transistor T1 is turned on when a voltage state of the node N1 is at a high level (case H). The on/off state of the transistor T1 in the case where the voltage state is at a low level (case L) will be described later.

The boost line BST is connected to one end of the boost capacitor element Cbst. For this reason, when a high-voltage level is applied to the boost line BST, the potential of the other end of the boost capacitor element Cbst, i.e., the potential of the output node N2 is raised. In this manner, it will be called "boost raising" that the voltage applied to the boost line BST is increased to raise the potential of the output node N2.

As described above, in the case H, the transistor T2 is in an off state at time t1. For this reason, a variation in potential of the node N2 caused by boost raising is determined by a ratio of a boost capacity Cbst to a full capacity parasitic in the node N2. As an example, when the ratio is 0.7, a potential of one electrode of a boost capacitor element increases by ΔVbst, and a potential of the other electrode, i.e., the node N2, consequently increases by about 0.7ΔVbst.

In the case H, since the internal node potential VN1 (H) approximately exhibits 5 V at time t1, when a potential that is higher than the potential VN1 (H) by a threshold voltage of 2 V or more is applied to the gate of the transistor T1, i.e., the output node N2, the transistor T1 is turned on. In the embodiment, a voltage applied to the boost line BST at time t1 is set to 10 V. In this case, the potential VN2 (H) of the output node N2 increases by 7 V. At a point of time immediately before time t1, since the node N2 exhibits a potential (5 V) almost equal to that of the node N1, the potential VN2 (H) of the node N2 exhibits about 12 V by boost raising. Thus, since a potential difference that is equal to or higher than a threshold voltage is generated between the gate of the transistor T1 and the node N1, the transistor T1 is turned on.

At this time, in the case L, the transistor T2 is turned on at time t1. More specifically, unlike in the case H, the output node N2 and the internal node N1 are electrically connected to each other. In this case, a variation in potential of the output node N2 caused by boost rising is influenced by, in addition to a boost capacity Cbst and a full parasitic capacity of the node N2, a full parasitic capacity of the internal node N1.

One terminal of the auxiliary capacitor element Cs and one end of the liquid crystal capacitor element Clc are connected to the internal node N1, and a full capacity Cp being parasitic in the internal node N1 is approximately expressed by a sum of the liquid crystal capacity Clc and the auxiliary capacity Cs as described above. The boost capacity Cbst has a value that is considerably smaller than that of a liquid crystal capacity Cp. Therefore, a ratio of the boost capacity to the total of capacities is very low, for example, a value of about 0.01 or less. In this case, when a potential of one electrode of the boost capacitor element increases by ΔVbst, a potential of the other electrode, i.e., the output node N2 increases by only about 0.01ΔVbst at most. More specifically, in the case B, even though ΔVbst=10 V, the potential VN2 (L) of the output node N2 hardly increases.

In the case L, since low-level writing is performed in the immediately previous writing action, the output node N2 exhibits about 0 V immediately before time t1. Thus, even though a high voltage is applied to the boost BST at time t1, the potential VN2 (L) of the output node N2 still exhibits about 0 V. If a ratio of a boost capacity to a full capacity being parasitic in the nodes N1 and N2 is about 0.1, the potential VN2 (L) increases by only about 1 V. When the threshold value of the transistor T1 is about 2 V, the transistor T1 is turned off.

It is a well known fact that the threshold voltage of a transistor fluctuates in process steps. The transistor T1 is no exception. Even though the step is designed such that the threshold voltages of the transistors T1 to T4 are about 2 V, the completed display device may possibly include a pixel circuit in which the threshold voltage of the transistor T1 exhibits a value sufficiently lower than 2 V. When the threshold voltage of the transistor T1 is sufficiently low, even in the case L, it is supposed that a leakage current through the transistor T1 is generated in a period from times t1 to t2 to turn on the transistor T1.

In this manner, even in the case L, in order to suggest that the transistor T1 is not always continuously in an off state in a period from times t1 to t2, in FIG. 17, T1(L) is described as "(OFF)" in parentheses to discriminate it from the off state simply described as "OFF". An applied voltage to the boost line at time t1 corresponds to a "first boost voltage".

At time t2, an applied voltage to the reference line REF is decreased to turn off the transistor T2 regardless of whether the case is the case H or the case L. In this manner, the nodes N1 and N2 are electrically disconnected from each other. The applied voltage to the reference line REF at this time corresponds to a “second control voltage”. The voltage is set to 0 V.

At time t3, the applied voltage to the boost line BST is slightly decreased. More specifically, the applied voltage to the boost line BST is decreased within the range in which the on state of the transistor T1 is not influenced in the case H. An applied voltage to the boost line at time t3 corresponds to a “second boost voltage”. The voltage is set to 7 V.

When the applied voltage to the boost line BST is decreased at time t3, the node N2 is electrically disconnected from the node N1 in both the cases H and L. For this reason, in both the cases, the potential VN2 of the node N2 drops with potential drop of the boost line BST.

When the threshold voltage of the transistor T1 is designed to be about 2 V, in a large number of pixel circuits 2A in the display device, the threshold voltages of the transistors T1 exhibit about 2 V. For this reason, in the case H, when the potential of the node N2 is about 7 V or less, the transistor T1 is turned off. In order to avoid this, a range of variation of a decrease in applied voltage to the boost line BST at time t3 is set such that the potential VN2 of the node N2 does not depart from the range in which the on state of the transistor T1 can be maintained in at least the case H. In this case, the voltage is decreased by 3 V.

As described above, when the transistor T2 is in an off state, a variation in potential of the node N2 associated with a variation in potential of the boost line BST is determined by a ratio of the boost capacity Cbst to the full capacity being parasitic in the node N2. Since the ratio is set to 0.7 here, when an applied voltage to the boost line BST is decreased by 3 V, the potential of the node N2 decreases by about 2 V. Since an applied voltage to the reference line REF at time t2 is set to 0 V, not only in the case H but also in the case L, the potential of the node N2 decreases by about 2 V. More specifically, the VN2 (H) in the case H exhibits about 10 V, and the VN2 (L) in the case L exhibits about −2 V. Even though the potential VN2 (H) of the node N2 in the case H decreases to about 10 V, the transistor T1 can be still kept in an on state without a problem.

In this manner, in a state in which the potential VN2 (L) of the node N2 in the case L is decreased to a negative potential in advance, a high-level voltage is applied to the selecting line SEL at time t4 to turn on the transistor T3, and a voltage in a first voltage state (5 V) is applied to the voltage supply line VSL.

As described above, since the transistor T1 has been already turned on in the case H, the transistor T3 is turned on to turn on the second switch circuit 23, and the voltage (5 V) in the first voltage state applied to the voltage supply line VSL is given to the internal node N1 through the second switch circuit 23. More specifically, in this manner, the internal node N1 is refreshed to the first voltage state.

On the other hand, in the case L, since the potential of the node N2 is negative (about −2 V), the transistor T1 is in an off state, and the second switch circuit 23 is turned off. In this manner, the voltage (5 V) in the first voltage state applied to the voltage supply line VSL is not applied to the internal node N1 through the second switch circuit 23.

In particular, before the transistor T3 is turned on, when the potential VN2 (L) of the node N2 in the case L is set to a negative potential, the transistor T1 can be sufficiently turned off even though the threshold voltage of the transistor T1 is considerably lower than 2 V set in design. In this manner, even though the threshold voltage fluctuates, the voltage (5 V) in the first voltage state applied to the voltage supply line VSL in the case L can be avoided from being given to the internal node N1, and the potential of the pixel electrode 20 can be kept in an immediately previous writing state.

As described above, in the phase P1, a refresh action is automatically selectively performed to the internal node N1 (H) in which writing was performed in the first voltage state.

In FIG. 17, a timing at which the voltage in the first voltage state (5 V) is applied to the voltage supply line VSL is synchronized with a timing (times t4 to t5) at which the transistor T3 is turned on. However, 5 V may be applied to the voltage supply line VSL in a period from times t1 to t5. Even in this case, since the transistor T3 is turned on in only the period from times t4 to t5, a refresh action is automatically selectively performed to only the internal node N1 (H) in which writing was performed in the first voltage state for the same reason as that in FIG. 17.

<<Phase P2>>

In a phase P2 started from time t2, voltages applied to the gate line GL, the source line SL, and the auxiliary capacitive line CSL and the counter voltage Vcom are continuously set to the same values as those in the phase P1.

A voltage that turns off the transistor T3 is applied to the selecting line SEL. The voltage is set to −5 V. In this manner, the second switch circuit 23 is turned off.

The voltage applied to the reference line REF is returned to the voltage (5 V) at a point of time t1. In this manner, the transistor T2 is turned on in the case L, and the potential VN2 (L) of the node N2 becomes almost equal to the potential VN1 (L) of the node N1 (returns to about 0 V). On the other hand, in the case H, the transistor T2 is still in an off state.

The voltage applied to the boost line BST is lowered to a voltage in a state before time t1 at which boost rising is performed. The voltage is set to 0 V. When the voltage of the boost line BST decreases, a potential of the node N1 is pushed down. Since the applied voltage at a point of time t4 is 7 V, the applied voltage to the boost line BST is consequently decreased by 7 V at time t5.

In this case, since the transistor T2 is in an on state in the case L, even though the voltage of the boost line BST changes, the potential of the node N2 is hardly influenced. On the other hand, in the case H, since the transistor T2 is in an off state, the potential VN2 (H) of the output node N2 also decreases with the decrease in applied voltage to the boost line BST. The applied voltage to the boost line BST decreases by 7 V in a period from times t4 to t5, and the potential VN2 (H) exhibits about 10 V at a point of time immediately before time t5 as described above. For this reason, the potential VN2 (H) decreases to about 5 V at time t5. In this manner, the level of the potential VN2(H) of the node N2 returns to that at the point of time t1. Since the transistor T2 is in an off state, the potential VN1 (H) of the node N1 is not influenced by the variation in potential of the node N2, and 5 V is kept.

In the phase P2, the same voltage state is maintained for a time considerably longer than that in the phase P1. Meanwhile, a low-level voltage (0 V) is applied to the source line SL. For this reason, by a leakage current generated through the transistor T4 meanwhile, the internal node potential VN1 (L) in the case L changes with time so as to approximate 0 V. More specifically, at a point of time immediately before time t1, even though a potential VN1 (L) of the internal node N1 in the case L is higher than 0 V, the potential changes toward 0 V in the period of the phase P2.

On the other hand, in the case H, the internal node potential VN1 (H) returns to 5 V by the phase P1. However, due to the presence of a leakage current thereafter, the potential gradually decreases with time.

As described above, in the phase P2, an action that causes the potential of the node N1 in which writing was performed in the second voltage state to be gradually close to 0 V is performed. A kind of indirect refresh action to the internal node N1 in which writing was performed in the second voltage state is performed.

Thereafter, the phases P1 and P2 are repeated to make it possible to return the potentials of the internal nodes N1 in both the cases H and L, i.e., pixel voltages to those in the immediately previous writing state.

As in the conventional technique, when a refresh action is to be performed by writing that is performed by voltage application through the source line SL, the gate lines GL need to be vertically scanned one by one. For this reason, a high-level voltage needs to be applied to the gate lines GL the number of times which is the number (n) of the gate lines. Since a potential having the same level as a potential level written in the immediately previous writing action needs to be applied to the source lines SL, charging/discharging actions need to be performed to each of the source lines SL up to n times.

In contrast to this, according to the embodiment, the voltage application control as shown in FIG. 17 is executed to the boost line BST, the selecting line SEL, and the reference line REF at times t1 to t5. Thereafter, the potentials of the lines are held constant to make it possible to return the internal node potential VN1 (potential of the pixel electrode 20) to a potential state in the writing action with respect to all pixels. In the period in which the self-refresh action is performed (throughout the phases P1 and P2), a low-level voltage needs only be continuously applied to all the gate lines GL and the source lines SL.

Thus, according to the self-refresh action of the embodiment, in comparison with a normal external refresh action, the number of times of voltage application to the gate lines GL and the number of times of voltage application to the source lines SL can be considerably reduced. Furthermore, the control contents can also be simplified. For this reason, power consumptions of the gate driver 14 and the source driver 13 can be considerably reduced.

In the case L, the potential VN2 of the node N2 in the phase P2 (times t5 to t6) is almost equal to the potential VN2 in the phase P1 in a period from times t1 to t2. When the threshold voltage of the transistor T1 fluctuates and exhibits a remarkably low threshold voltage, for the same reason as described above in the period from times t1 to t2, a leakage current through the transistor T1 may be possibly generated. Thus, the on/off state of the transistor T1 meanwhile is described as "(OFF)" in parentheses as in the period of times t1 to t2.

(Second Type)

Figure 18:
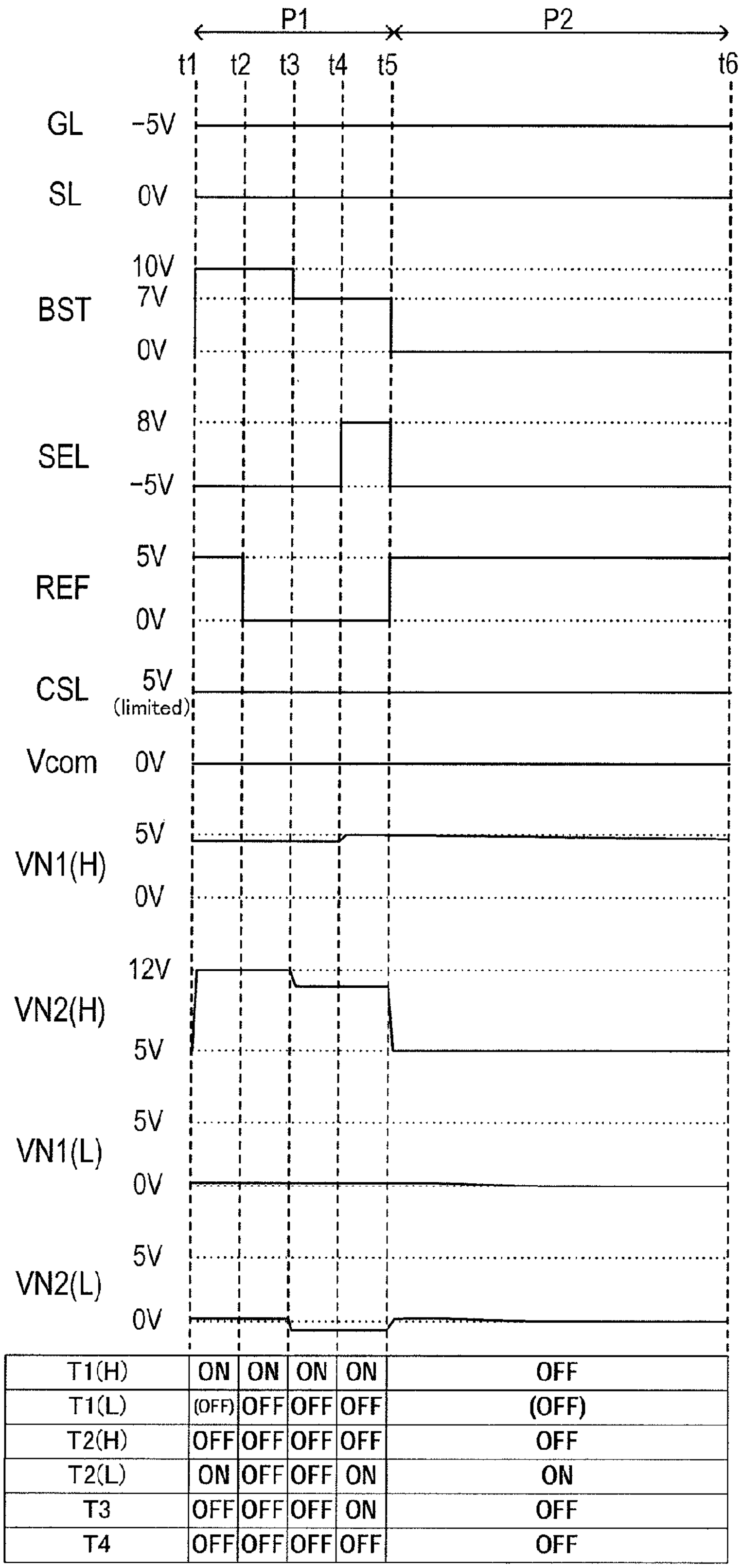
FIG. 18 is a timing chart of self-refresh actions performed by the pixel circuits of the second and fifth types.

The pixel circuit 2B of the second type shown in FIG. 8 has a configuration in which the voltage supply line VSL also serves as the auxiliary capacitive line CSL. For this reason, the second type is different from the first type in that a high-level voltage (5 V) in the first voltage state is applied to the auxiliary capacitive line CSL in the phase P1. FIG. 18 shows a timing chart of a self-refresh action state in the pixel circuit of the second type.

In the second type, as will be described later, in a writing action in an always-on display mode, a voltage applied to the auxiliary capacitive line CSL is fixed to any one of the first voltage state (5 V) and the second voltage state (0 V). In the type, a self-refresh action can be executed when a voltage of 5 V is applied to the auxiliary capacitive line CSL in writing. At this time, also in the self-refresh action, an applied voltage (5 V) to the auxiliary capacitive line CSL is fixed. The other configurations are the same as those in the first type shown in FIG. 17. In FIG. 18, "5 V (limited)" is expressed in a column for the applied voltage to the auxiliary capacitive line CSL to clearly show that 0 V cannot be employed as the applied voltage to the auxiliary capacitive line CSL.

In the configuration described above, in the case H, since both the transistors T1 and T3 are turned on from times t4 to t5, the voltage (5 V) in the first voltage state is given from the auxiliary capacitive line CSL to the internal node N1 through the second switch circuit 23 to perform a refresh action. In the case L, since the transistor T1 is in an off state from times t4 to t5, the second switch circuit 23 is in an off state. In this manner, the low-level voltage of the internal node N1 is maintained.

(Third Type)

Figure 19:
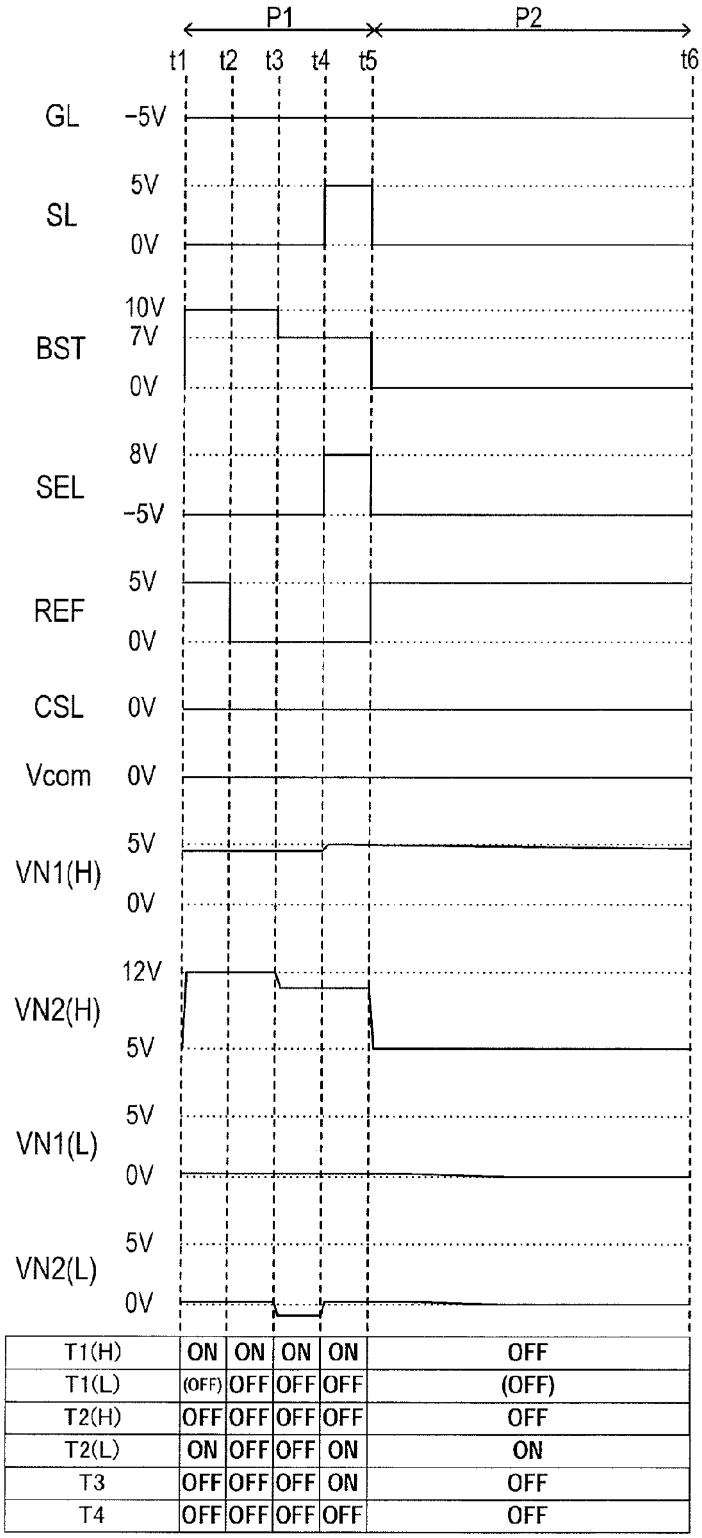
FIG. 19 is a timing chart of self-refresh actions performed by the pixel circuits of the third and sixth types.

The pixel circuit 2C of the third type shown in FIG. 9 has a configuration in which the voltage supply line VSL also serves as the source line SL. For this reason, the third type is different from the first type in that a high-level voltage (5 V) in the first voltage state is applied to the source line SL from times t4 to t5. FIG. 19 shows a timing chart of a self-refresh action state in the pixel circuit of the third type.

In FIG. 19, although 5 V is supplied to the source SL in only the period from times t4 to t5, 5 V may be given to the source line SL from times t1 to t5.

In the case H, since both the transistors T1 and T3 are turned on from times t4 to t5, the voltage (5 V) in the first voltage state is given from the source line SL to the internal node N1 through the second switch circuit 23 to perform a refresh action. In the case L, since the transistor T1 is in an off state from times t4 to t5, the second switch circuit 23 is also in an off state. In this manner, the low-level voltage of the internal node N1 is maintained.

(Fourth Type)

The pixel circuit 2D of the fourth type shown in FIG. 10 is similar to the pixel circuit 2A of the first type in that the voltage supply line VSL is configured by an independent signal line. More specifically, in the period from times t4 to t5 in the phase P1, 5 V is given from the voltage supply line VSL to the internal node N1 through the second switch circuit 23 in the case H to execute a refresh action. On the other hand, in the case L, in the period from times t4 to t5, the transistor T1 is turned off to set the second switch circuit 23 to an off state, and 5 V is prevented from being supplied from the reference line REF to the internal node N1.

In the fourth type, the transistor T3 also configures one element of the first switch circuit 22. However, the transistor T4 is turned off in the phase P1 to make it possible to turn off the first switch circuit 22. For this reason, even though the transistor T3 is turned on meanwhile, an applied voltage to the source line SL is not given to the internal node N1. This is also applied to a modification of the pixel circuit of the fourth type shown in FIGS. 11 and 12.

Based on the above circumstances, the pixel circuit 2D of the fourth type can execute a self-refresh action by the same voltage applying method as that in the pixel circuit 2A of the first type shown in the timing chart of FIG. 17.

(Fifth Type)

The pixel circuit 2E of the fifth type shown in FIG. 13 is similar to the pixel circuit 2B of the second type in that the auxiliary capacitive line CSL also serves as the voltage supply line VSL. A different point between the pixel circuits of the second type and the sixth type is the same as a different point between the pixel circuits of the first type and the fourth type.

Thus, according to the same theory as that in the fourth type, the pixel circuit 2E of the fifth type can execute a self-refresh action by the same voltage applying method as that in the pixel circuit 2B of the second type shown in the timing chart of FIG. 18.

(Sixth Type)

The pixel circuit 2F of the sixth type shown in FIG. 14 is similar to the pixel circuit 2C of the third type in that the source line SL also serves as the voltage supply line VSL. A different point between the pixel circuits of the third type and the sixth type is the same as a different point between the pixel circuits of the first type and the fourth type.

Thus, according to the same theory as that in the fourth type, the pixel circuit 2E of the sixth type can execute a self-refresh action by the same voltage applying method as that in the pixel circuit 2C of the third type shown in the timing chart of FIG. 19. This is similarly applied to the circuit configurations in FIG. 15 and FIG. 16.

Third Embodiment

In the third embodiment, a writing action in an always-on display mode will be described in units of types with reference to the accompanying drawings.

In the writing action in the always-on display mode, pixel data of one frame is divided in units of display lines in a horizontal direction (row direction), and a binary voltage corresponding to each pixel data of one display line, i.e., a high-level voltage (5 V) or a low-level voltage (0 V) is applied to the source line SL of each column for each horizontal period. A selected-row voltage of 8 V is applied to the gate line GL of a selected display line (selected row) to turn on the first switch circuits 22 of all the pixel circuits 2 of the selected row, and voltages of the source lines SL of the columns are transferred to the internal node N1 of each of the pixel circuits 2 of the selected row.

A non-selected row voltage of −5 V is applied to the gate lines GL of display lines (non-selected rows) except for the selected display lines to turn off the first switch circuits 22 of all the pixel circuits 2 of the non-selected rows. Timing control of a voltage application of each signal line in a writing action (will be described later) is performed by the display control circuit 11, and each voltage application is performed by the display control circuit 11, the counter electrode drive circuit 12, the source driver 13, and the gate driver 14.

(First Type)

Figure 20:
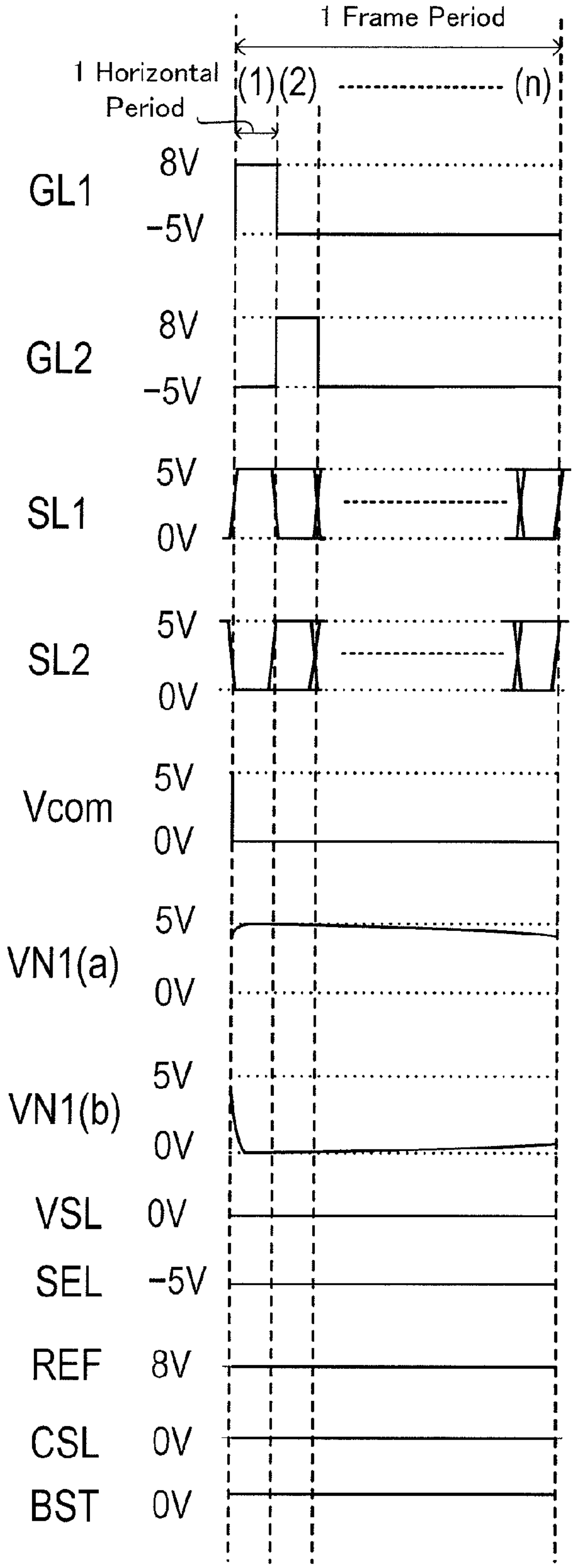
FIG. 20 is a timing chart of a writing action in an always-on display mode performed by the pixel circuit of the first type.

FIG. 20 is a timing chart of a writing action using the pixel circuit 2A (FIG. 8) of the first type. FIG. 20 shows voltage waveforms of two gate lines GL1 and GL2, two source lines SL1 and SL2, the voltage supply line VSL, the selecting line SEL, the reference line REF, the auxiliary capacitive line CSL, and the boost line BST in a 1-frame period and a voltage waveform of the counter voltage Vcom. Furthermore, in FIG. 20, variation waveforms of the potentials VN1 of the internal nodes N1 of the two pixel circuits 2A are additionally shown. One of the two pixel circuits 2A is a pixel circuit 2A(a) selected by the gate line GL1 and the source line SL1, and the other is a pixel circuit 2A(b) selected by the gate line GL1 and the source line SL2. The pixel circuits are discriminated from each other by adding (a) and (b) to the backs of VN1 in FIG. 20.

A 1-frame period is divided into horizontal periods the number of which is the number of gate lines GL, and gate lines GL1 to GLn to be selected are sequentially allocated to the horizontal periods, respectively. FIG. 20 shows changes in voltage of the two gate lines GL1 and GL2 in first two horizontal periods. In the first horizontal period, a selected-row voltage of 8 V is applied to the gate line GL1, and a non-selected row voltage of −5 V is applied to the gate line GL2. In the second horizontal period, the selected-row voltage of 8 V is applied to the gate line GL2, and the non-selected row voltage of −5 V is applied to the gate line GL1. In the subsequent horizontal periods, the non-selected row voltage of −5 V is applied to both the gate lines GL1 and GL2.

A voltage (5 V, 0 V) corresponding to pixel data of a display line corresponding to each horizontal period is applied to the source line SL of each column. In FIG. 20, the two source lines SL1 and SL2 are shown as typical source lines SL. In the example shown in FIG. 20, in order to explain a change of the internal node potential VN1, voltages of the two source lines SL1 and SL2 of the first horizontal period are separately set to 5 V and 0 V, respectively.

In the pixel circuit 2A of the first type, since the first switch circuit 22 is configured by only the transistor T4, turn-on/off control of the first switch circuit 22 is sufficiently performed by turn-on/off-controlling only the transistor T4. Furthermore, the second switch circuit 23 needs not be turned on in the writing action, and, in order to prevent the second switch circuit 23 from being turned on in the pixel circuit 2A of a non-selected row, in a 1-frame period, a non-selected voltage of −5 V (may be 0 V) is applied to the selecting lines SEL connected to all the pixel circuits 2A. The same voltage as that of the selecting line SEL is also applied to the boost line BST. Since the second switch circuit 23 is in an off state, no voltage needs be applied to the voltage supply line VSL, and the voltage is set to 0 V here.

In order to always set, the transistor T2 in an on state regardless of a voltage state of the internal node N1, 8 V that is higher than a high-level voltage (5 V) by a threshold voltage (about 2 V) or more is applied to the reference line REF in a 1-frame period. In this manner, the output node N2 and the internal node N1 are electrically connected to each other, and the auxiliary capacitor element Cs connected to the internal node N1 can be used to hold the potential VN1 of the internal node so as to contribute to the stabilization. The auxiliary capacitive line CSL is fixed to a predetermined fixed voltage (for example, 0 V). Although the counter AC drive is performed on the counter voltage Vcom, the counter voltage Vcom is fixed to 0 V or 5 V in a 1-frame period. In FIG. 20, the counter voltage Vcom is fixed to 0 V.

(Second to Third Types)

Referring to the timing chart of the writing action in the pixel circuit 2A of the first type shown in FIG. 20, a low-level voltage is always applied to the selecting line SEL throughout a 1-frame period. That is, the second switch circuit 23 is always in an off state.

Therefore, also in the pixel circuit 2B of the second type in which one end of the second switch circuit 23 is connected to the auxiliary capacitive line CSL or the pixel circuit 2C of the third type in which one end of the second switch circuit 23 is connected to the source line SL, the writing action can be performed by the same voltage application as that in the timing chart of the first type. In the second and third types, since the voltage supply line VSL is not present as an independent signal line, an actual timing chart corresponds to a timing chart in which a description about the voltage supply line VSL is deleted from the timing chart in FIG. 20.

(Fourth Type)

In the pixel circuit 2D of the fourth type shown in FIG. 10, since the first switch circuit 22 is configured by a series circuit of the transistor T4 and the transistor T3, not only the transistor T4 but also the transistor T3 need to be turned on in writing. With respect to this point, a sequence is different from that in the pixel circuit 2A of the first type.

Figure 21:
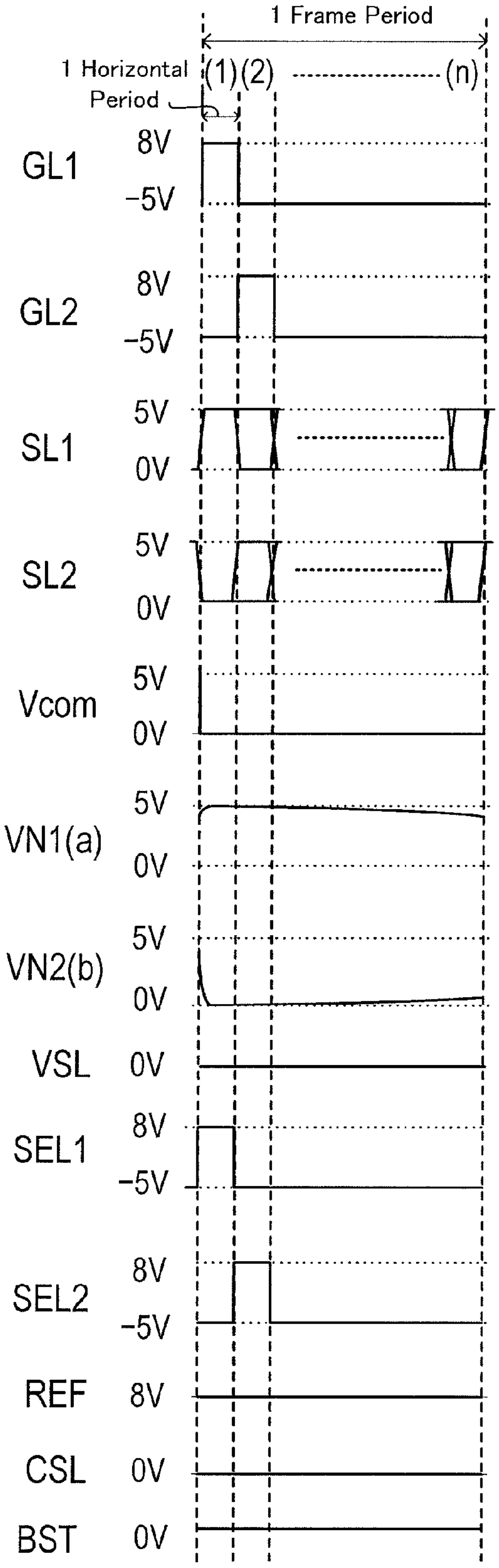
FIG. 21 is a timing chart of a writing action in an always-on display mode performed by the pixel circuit of the fourth type.

FIG. 21 is a timing chart of a writing action using the pixel circuit 2D of the fourth type. The items in FIG. 21 are the same as those in FIG. 20 except that two selecting lines SEL1 and SEL2 are shown.

Voltage application timings and voltage amplitudes of the gate lines GL (GL1, GL2) and source lines SL (SL1, SL2) are all the same as those in FIG. 20.

In the pixel circuit 2E, since the first switch circuit 22 is configured by a series circuit of the transistor T4 and the transistor T3, when turn-on/off control of the first switch circuit 22 is performed, in addition to the turn-on/off control of the transistor T4, the turn-on/off control of the transistor T3 is required. Thus, in the type, all the selecting lines SEL are not controlled in a lump but, like the gate lines GL, must be independently controlled in units of rows. More specifically, the selecting lines SEL the number of which is the same as the number of gate lines GL1 to GLn are arranged in units of rows one by one, and the selecting lines SEL are sequentially selected like the gate lines GL1 to GLn.

FIG. 21 shows changes in voltage of the two selecting lines SEL1 and SEL2 in first two horizontal periods. In the first horizontal period, a selecting voltage of 8 V is applied to the selecting line SEL1, and a non-selecting voltage of −5 V is applied to the selecting line SEL2. In the second horizontal period, the selecting voltage of 8 V is applied to the selecting line SEL2, and the non-selecting voltage of −5 V is applied to the selecting line SEL1. In the subsequent horizontal periods, the non-selecting voltage of −5 V is applied to both the selecting lines SEL1 and SEL2.

Application voltages to the voltage supply line VSL, the reference line REF, the auxiliary capacitive line CSL, and the boost line BST and the counter voltage Vcom are the same as those in the first type shown in FIG. 20. In a non-selected row, when the first switch circuit 22 is set to an off state, the transistor T4 is completely turned off. For this reason, a non-selecting voltage of the selecting line SEL to turn off the transistor T3 needs not be −5 V but may be 0 V.

In the pixel circuit of the type, the transistor T3 is turned on in writing. However, since 8 V is applied to the reference line REF, even though the internal node N1 is in the first voltage state, the transistor T1 is not turned on in a direction from the reference line REF to the transistor T3. For this reason, 8 V applied to the reference line REF is not given to the internal node N1 through the second switch circuit 23, and a correct writing voltage given to the source line SL is given to the node N1.

(Fifth Type)

Also in the pixel circuit 2E of the fifth type shown in FIG. 13, as in the fourth type, the selecting lines SEL are not controlled in a lamp, but need to be independently controlled in units of rows like the gate lines GL. More specifically, the selecting lines SEL the number of which is the same as the number of gate lines GL1 to GLn are arranged in units of rows one by one, and the selecting lines SEL are sequentially selected like the gate lines GL1 to GLn.

In the configuration of the type, since the transistor T3 is turned on in writing, 5 V needs to be given to the auxiliary capacitive line CSL to prevent the potential VN1 of the internal node N1 from being varied by turning on the second switch circuit 23. The remaining writing action can be performed by the same voltage applying method as that in the pixel circuit 2D of the fourth type shown in FIG. 19 except that a description about the voltage supply line VSL is not necessary.

(Sixth Type)

Also in the pixel circuit 2F of the sixth type shown in FIG. 14, as in the fourth type, the selecting lines SEL are not controlled in a lamp, but need to be independently controlled in units of rows like the gate lines GL. More specifically, the selecting lines SEL the number of which is the same as the number of gate lines GL1 to GLn are arranged in units of rows one by one, and the selecting lines SEL are sequentially selected like the gate lines GL1 to GLn.

In the configuration of the type, since the second switch circuit 23 is configured to be connected to the source line SL together with the first switch circuit 22, even though the transistor T3 is turned on in writing, the potential VN1 of the internal node does not vary. For this reason, a special countermeasure against that is not necessary. More specifically, a writing action can be performed by the same voltage applying method as that in the pixel circuit 2D of the fourth type shown in FIG. 19 except that a description about the voltage supply line VSL is not necessary.

Fourth Embodiment

In the fourth embodiment, a relationship between a self-refresh action and a writing action in an always-on display mode will be described below.

In the always-on display mode, after a writing action is executed to image data of one frame, display contents obtained by the immediately previous writing action can be maintained without performing the writing action in a predetermined period.

By the writing action, a voltage is given to the pixel electrode 20 in each pixel through the source line SL. Thereafter, the gate line GL is set at a low level, and the transistor T4 is turned off. However, a potential of the pixel electrode 20 is kept by the presence of charges accumulated in the pixel electrode 20 by the immediately previous writing action. More specifically, a voltage Vlc is maintained between the pixel electrode 20 and the counter electrode 80. In this manner, even after the writing action is completed, a state in which a voltage required to display image data is applied across both the terminals of the liquid crystal capacity Clc continues.

When a potential of the counter electrode 80 is fixed, the liquid crystal voltage Vlc depends on the potential of the pixel electrode 20. The potential varies with time in association with generation of a leakage current of a transistor in the pixel circuit 2. For example, when a potential of the source line SL is lower than a potential of the internal node N1, a leakage current flowing from the internal node N1 to the source line SL is generated, and the internal node potential VN1 decreases with time. In contrast to this, when the potential of the source line SL is higher than the potential of the internal node N1, a leakage current flowing from the source line SL to the internal node N1 is generated, and a potential of the pixel electrode 20 increases with time. More specifically, when time has elapsed without performing an external writing action, the liquid crystal voltage Vlc gradually changes. As a result, a displayed image changes.

In a normal display mode, a writing action is executed to all the pixel circuits 2 in units of frames even in a still image. Therefore, the amount of electric charges accumulated in the pixel electrode 20 need only be maintained in a 1-frame period. Since a variation in potential of the pixel electrode 20 in a 1-frame period at most is very small, the variation in potential meanwhile does not give an influence that is enough to be visually confirmed to image data to be displayed. For this reason, in the normal display mode, the variation in potential of the pixel electrode 20 does not cause a serious problem.

In contrast to this, in the always-on display mode, a writing action is not configured to be executed for each frame. Therefore, while the potential of the counter electrode 80 is fixed, depending on the circumstances, the potential of the pixel electrode 20 needs to be kept for several frames. However, when the pixel circuit is left without performing a writing action for several frame periods, a potential of the pixel electrode 20 intermittently varies due to generation of the leakage current described above. As a result, image data to be displayed may be changed enough to be visually confirmed.

Figure 22:
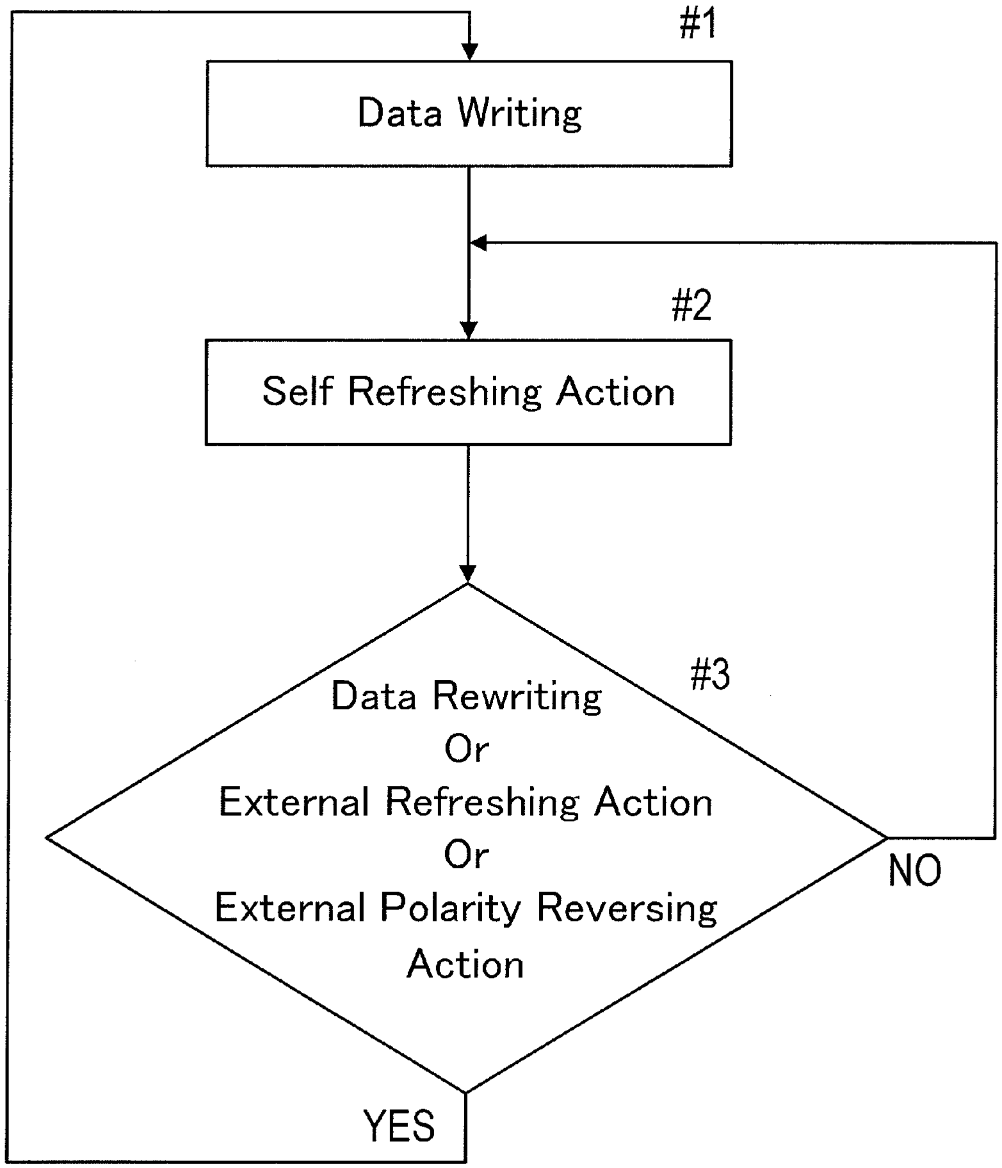
FIG. 22 is a flow chart showing procedures of the writing action and a self-refresh action in the always-on display mode.

In order to avoid the phenomenon, in the always-on display mode, by the manner shown in the flow chart in FIG. 22, the self-refresh action and the writing action are executed in combination with each other to considerably reduce a power consumption while suppressing a variation in potential of the pixel electrode.

A writing action of pixel data of one frame in the always-on display mode is executed by the manner described in the above fifth embodiment (step #1).

After the writing action in step #1, a self-refresh action is executed by the manner described in the above second embodiment (step #2). The self-refresh action is realized by the phase P1 in which a pulse voltage is applied and the phase P2 in which a standby state is set.

In this case, in a period of the phase P2 of the self-refresh action period, when a request for a writing action (data writing) of new pixel data, an external refresh action, or an external polarity inverting action is received (YES in step #3), the control flow returns to step #1 to execute the writing action of the new pixel data or previous pixel data. In the period of the phase P2, when the request is not received (NO in step #3), the control flow returns to step #2 to execute the self-refresh action again. In this manner, a change of a display image by an influence of a leakage current can be suppressed.

When a refresh action is to be performed by a writing action without performing a self-refresh action, a power consumption expressed by the relational expression shown in numerical expression 1 described above is obtained. However, when the self-refresh action is repeated at the same refresh rate, the number of times of driving all source line voltages is one. For this reason, the variable m in numerical expression 1 becomes 1. When VGA is supposed as a display resolution (the number of pixels), m=1920 and n=480. Thus, a power consumption is expected to be reduced to about 1/1920 of it.

In the embodiment, the reason the self-refresh action and the external refresh action or the external polarity inverting action are used in combination with each other is to cope with the following case. That is, even in the pixel circuit 2 that normally operates at first, the second switch circuit 23 or the control circuit 24 is defected by aging, although a writing action can be performed without a trouble, a self-refresh action cannot be normally executed in some pixel circuits 2. More specifically, when only the self-refresh action is performed, displays of the corresponding pixel circuits 2 are deteriorated, and the deterioration is fixed. However, when the external polarity inverting action is additionally used, the display defect can be prevented from being fixed.

In the pixel circuits (2B, 2E) of the second and fifth types, in order to realize the flow of the embodiment, the auxiliary capacitive line CSL needs to be set to 5 V in step #1 to execute a writing action as described in the second embodiment.

Fifth Embodiment

In the fifth embodiment, a writing action in a normal display mode will be described for each type with reference to the accompanying drawings.

In the writing action in the normal display mode, pixel data of one frame is divided in units of display lines in a horizontal direction (row direction), and a multi-tone analog voltage corresponding to each pixel data of one display line is applied to the source line SL of each column for each horizontal period, and a selected-row voltage of 8 V is applied to the gate line GL of a selected display line (selected row) to turn on the first switch circuits 22 of all the pixel circuits 2 of the selected row, and voltages of the source lines SL of each column are transferred to the internal node N1 of each of the pixel circuits 2 of the selected row. A non-selected row voltage of −5 V is applied to the gate lines GL of display lines (non-selected rows) except for the selected display line to turn off the first switch circuits 22 of all the pixel circuits 2 of the non-selected row.

Timing control of a voltage application of each signal line in a writing action (will be described later) is performed by the display control circuit 11, and each voltage application is performed by the display control circuit 11, the counter electrode drive circuit 12, the source driver 13, and the gate driver 14.

Figure 23:
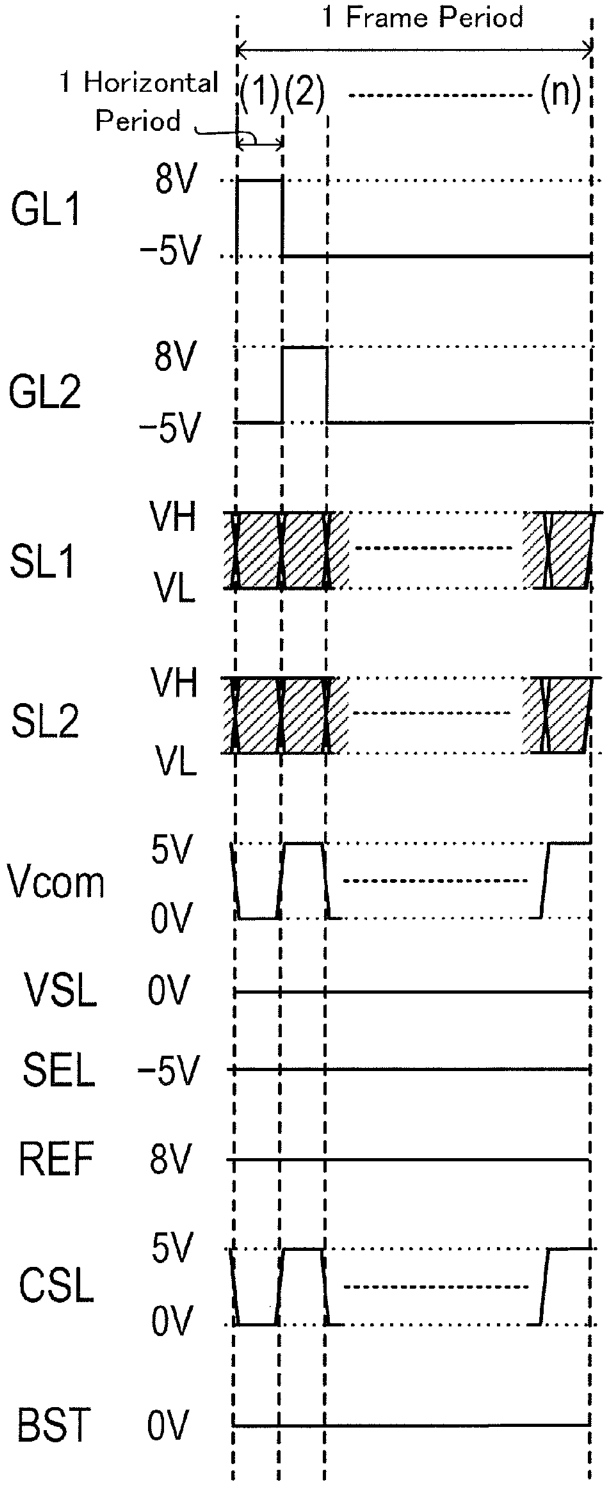
FIG. 23 is a timing chart of the writing action in a normal display mode performed by the pixel circuit of the first type.

FIG. 23 is a timing chart of a writing action using the pixel circuit 2A of the first type. FIG. 23 shows voltage waveforms of the two gate lines GL1 and GL2, the two source lines SL1 and SL2, the selecting line SEL, the reference line REF, the voltage supply line VSL, the auxiliary capacitive line CSL, and the boost line BST in a 1-frame period and a voltage waveform of the counter voltage Vcom.

A 1-frame period is divided into horizontal periods the number of which is the number of gate lines GL, and gate lines GL1 to GLn to be selected are sequentially allocated to the horizontal periods, respectively. FIG. 23 shows changes in voltage of the two gate lines GL1 and GL2 in first two horizontal periods. In the first horizontal period, a selected-row voltage of 8 V is applied to the gate line GL1, and a non-selected row voltage of −5 V is applied to the gate line GL2. In the second horizontal period, the selected-row voltage of 8 V is applied to the gate line GL2, and the non-selected row voltage of −5 V is applied to the gate line GL1. In the subsequent horizontal periods, the non-selected row voltage of −5 V is applied to both the gate lines GL1 and GL2.

A multi-tone analog voltage corresponding to pixel data of a display line corresponding to each horizontal period is applied to the source line SL of each column. In the normal display mode, a multi-tone analog voltage corresponding to pixel data of an analog display line is applied, and the application voltage is not uniquely specified. For this reason, this area is expressed by hatching the area in FIG. 23. In FIG. 23, the two source lines SL1 and SL2 are shown as typical source lines SL1, SL2, . . . , SLm.

Since the counter voltage Vcom changes for each horizontal period (counter AC drive), the analog voltage has a voltage value corresponding to the counter voltage Vcom in the same horizontal period. More specifically, an analog voltage applied to the source line SL is set such that the liquid crystal voltage Vlc given by numerical expression 2 changes in only polarity without changing in absolute value depending on whether the counter voltage Vcom is 5 V or 0 V.

In the pixel circuits of the first to third types, since the first switch circuit 22 is configured by only the transistor T4, turn-on/off control of the first switch circuit 22 is sufficiently performed by turn-on/off-controlling only the transistor T4. Furthermore, the second switch circuit 23 needs not be turned on in the writing action, and, in order to prevent the second switch circuit 23 from turning on in the pixel circuit 2A of a non-selected row, a non-selecting voltage of −5 V is applied to the selecting lines SEL connected to all the pixel circuits 2A in a 1-frame period. The non-selecting voltage is not limited to a negative voltage and may be 0 V.

In the 1-frame period, a voltage that always sets the transistor T2 in an on state regardless of a voltage state of the internal node N1 is applied to the reference line REF. The voltage value needs only be higher than a maximum value of voltage values given from the source line SL as multi-tone analog voltages by a threshold voltage or more of the transistor T2. In FIG. 23, the maximum value is set to 5 V, and the threshold voltage is set to 2 V, and 8 V that is higher than the sum of the voltages is applied. As in FIG. 20, 0 V is applied to the voltage supply line VSL.

Since the counter AC drive is performed on the counter voltage Vcom for each horizontal period, the auxiliary capacitive line CSL is driven to have a voltage equal to the counter voltage Vcom. The pixel electrode 20 is capacitively coupled to the counter electrode 80 through a liquid crystal layer and also capacitively coupled to the auxiliary capacitive line CSL through the auxiliary capacitor element Cs. For this reason, when the voltage of the auxiliary capacitor element C2 on the auxiliary capacitive line CSL side is fixed, a change of the counter voltage Vcom is divided between the auxiliary capacitive line CSL and the auxiliary capacitor element C2 and appears at the pixel electrode 20, and the liquid crystal voltages Vlc of the pixel circuits 2 of a non-selected row vary. Thus, when all the auxiliary capacitive lines CSL are driven at the same voltage as the counter voltage Vcom, the voltages of the counter electrode 80 and the pixel electrode 20 change in the same voltage direction, and variation in the liquid crystal voltages Vlc of the pixel circuits 2 of the non-selected row can be suppressed.

As described in the third embodiment, for the same reason as that in the writing action in the always-on display mode, even in the pixel circuits of the second and third types, the writing action can be realized by the same voltage applying method as that in the first type. In the pixel circuits of the fourth to sixth types, as in the writing action in the always-on display mode, the selecting lines SEL may be independently controlled in units of rows, and the remaining writing action can be performed by the same voltage applying method as that in the first type.

In the writing action in the normal display mode, as a method of inverting the polarity of each display line for each horizontal period, in addition to the “counter AC drive” described above, there is a method of applying a predetermined fixed voltage to the counter electrode 80 as the counter voltage Vcom. According to the method, a voltage applied to the pixel electrode 20 alternately changes into a positive voltage or a negative voltage every horizontal period with reference to the counter voltage Vcom.

In this case, there are a method of directly writing the pixel voltage through the source line SL and a method of adjusting a voltage to any one of a positive voltage and a negative voltage with reference to the counter voltage Vcom by capacitive coupling using the auxiliary capacitor element Cs after a voltage falling within a voltage range centered at the counter voltage Vcom is written. In this case, the auxiliary capacitive line CSL is not driven at the same voltage as the counter voltage Vcom, and independently pulse-driven in units of rows.

In the embodiment, in the writing action in the normal display mode, a method of inverting the polarity of each display line for each horizontal period is employed. However, this method is employed to cancel a disadvantage (will be described later) occurring when polarity inversion is performed in units of frames. As the method of canceling the disadvantage, there are a method of performing polarity inversion drive for each column and a method of simultaneously performing polarity inversion drive in units of pixels in row and column directions.

It is assumed that the positive liquid crystal voltage Vlc is applied in all pixels in a certain frame F1 and the negative liquid crystal voltage Vlc is applied in all the pixels in the next frame F2. Even though the voltages having the same absolute value are applied to the liquid crystal layer 75, light transmittances may be slightly different from each other depending on the positive polarity or the negative polarity. When a high-quality still image is displayed, the presence of the slight difference may possibly cause small changes in display manners in the frame F1 and the frame F2. Even in a moving image display state, in a display area in which the same display contents should be displayed in the frames, the display manners may be possibly slightly changed. In display of a high-quality still image or moving image, it is assumed that even the slight change can be visually recognized.

Since the normal display mode is a mode of displaying a high-quality still image or moving image, the above slight change may be possibly visually recognized. In order to avoid the phenomenon, in the embodiment, the polarity is inverted for each display line in the same frame. In this manner, since the liquid crystal voltages Vlc having polarities different between display lines in the same frame are applied, an influence on display image data based on the polarity of the liquid crystal voltage Vlc can be suppressed.

Another Embodiment

Another embodiment will be described below.

<1> With respect to the pixel circuits 2A to 2F, in writing actions in the normal display mode and the always-on display mode, a low-level voltage may be given to the reference line REF to set the transistor T2 in an off state. In this manner, when the internal node N1 and the output node N2 are electrically separated from each other, the potential of the pixel electrode 20 is not influenced by the voltage of the output node N2 obtained before the writing action. In this manner, the potential VN1 of the internal node N1 correctly reflects an application voltage to the source line SL, and the image data can be displayed without an error.

As described above, a total parasitic capacity of the node N1 is considerably larger than that of the node N2, and the potential of the node N2 in the initial state hardly influences the potential VN1. For this reason, it is preferable that the transistor T2 may be always in an on state.

<2> In the embodiment, the second switch circuits 23 and the control circuits 24 are arranged in each of all the pixel circuits 2 arranged on the active matrix substrate 10. In contrast to this, when pixel units of two types, i.e., a transmissive pixel unit that performs a transmissive liquid crystal display and a reflective pixel unit that performs a reflective liquid crystal display are arranged on the active matrix substrate 10, only pixel circuits of the reflective pixel unit may include the second switch circuits 23 and the control circuits 24, and pixel circuits of the transmissive display unit may not include the second switch circuits 23 and the control circuits 24.

In this case, an image display is performed by the transmissive pixel unit in the normal display mode, and an image display is performed by the reflective pixel unit in the always-on display mode. With the above configuration, the number of elements formed on the entire area of the active matrix substrate 10 can be reduced.

<3> In the embodiment, each of the pixel circuits 2 includes the auxiliary capacitor element Cs. However, the pixel circuit 2 needs not to include the auxiliary capacitor element Cs. However, in order to more stabilize the potential of the internal node N1 to reliably stabilize a display image, the auxiliary capacitor element Cs is preferably included.

Figure 24:
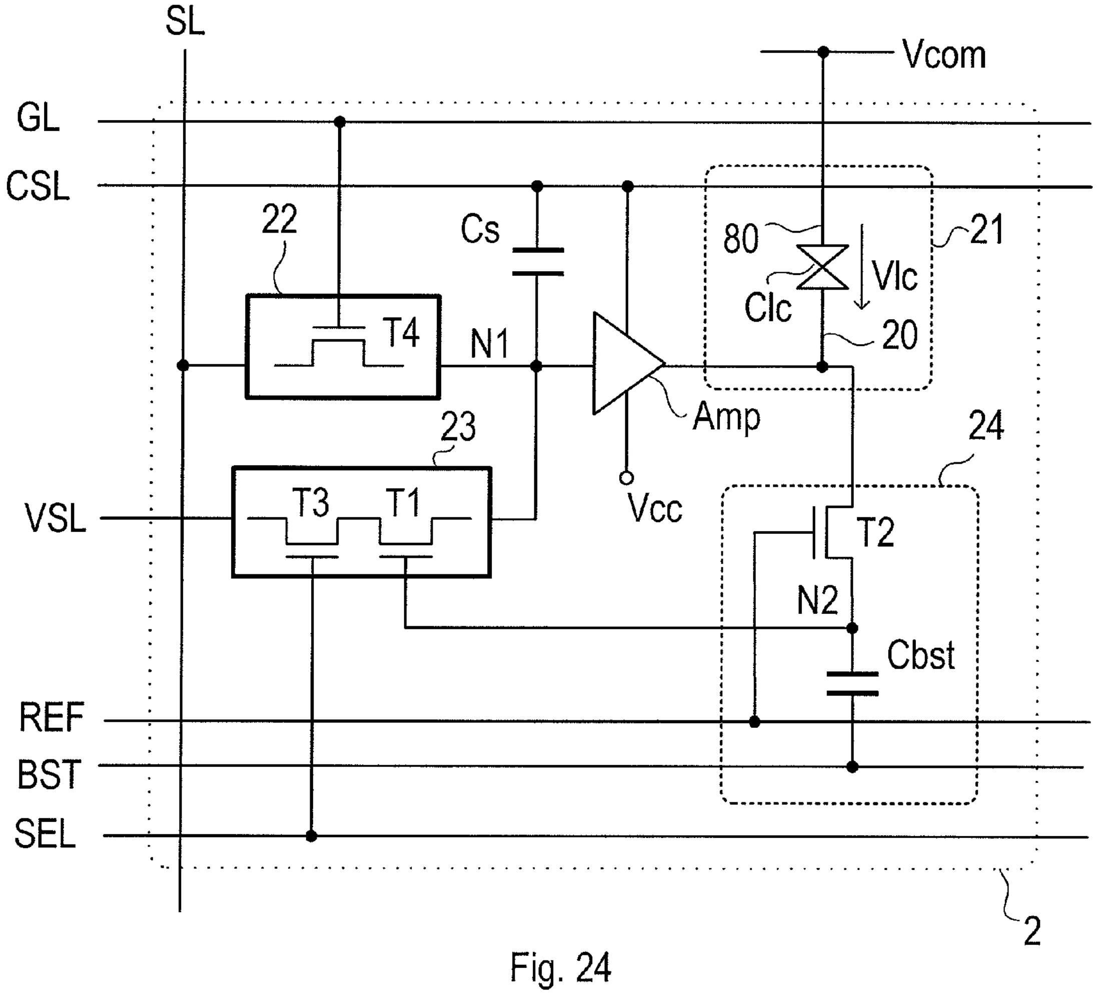
FIG. 24 is a circuit diagram showing still another basic circuit configuration of the pixel circuit of the present invention.

<4> In the embodiment, it is assumed that the display element unit 21 of each of the pixel circuits 2 is configured by only the unit liquid crystal display element Clc. However, as shown in FIG. 24, an analog amplifier Amp (voltage amplifier) may be arranged between the internal node N1 and the pixel electrode 20. In FIG. 24, as an example, as a power supply line for the analog amplifier Amp, the auxiliary capacitive line CSL and a power supply line Vcc are input.

In this case, a voltage given to the internal node N1 is amplified by a gain $\eta$ set by the analog amplifier Amp, and the amplified voltage is supplied to the pixel electrode 20. Thus, in the configuration, a small voltage change at the internal node N1 can be reflected on a display image.

<5> In the embodiment, the transistors T1 to T4 in the pixel circuit 2 are supposed to be n-channel polycrystalline silicon TFTs. However, a configuration using p-channel TFTs or a configuration using amorphous silicon TFTs can also be used. Also in a display device having a configuration using p-channel TFTs, the pixel circuits 2 can be operated by the same manner as that in each of the above embodiments, and the same effect as that in each of the above embodiments can be obtained, by inverting polarities of a power supply voltage and voltage values shown as the above described action condition, by reversing application voltages in the case A and the case B, by replacing the first voltage state (5 V) and the second voltage state (0 V) with the first voltage state (0 V) and the second voltage state (5 V), respectively in a writing action in an always-on display mode, or the like.

<6> In the embodiments, voltage values in the first and second voltage states of the internal node potential VN1 and the counter voltage Vcom in the always-on display mode are supposed to be 0 V and 5 V, respectively, and, accordingly, voltage values applied to the signal lines are set to −5 V, 0 V, 5 V, 7 V, 8V, and 10 V, respectively. However, the voltage values can be arbitrarily set depending on the characteristics (threshold voltages or the like) of liquid crystal elements and transistor elements to be used.

<7> In the embodiments, the liquid crystal display device is exemplified. However, the present invention is not limited to the embodiments. The present invention can be applied to any display device that has a capacity corresponding to the pixel capacity Cp to hold pixel data and displays an image based on a voltage held in the capacity.

Figure 25:
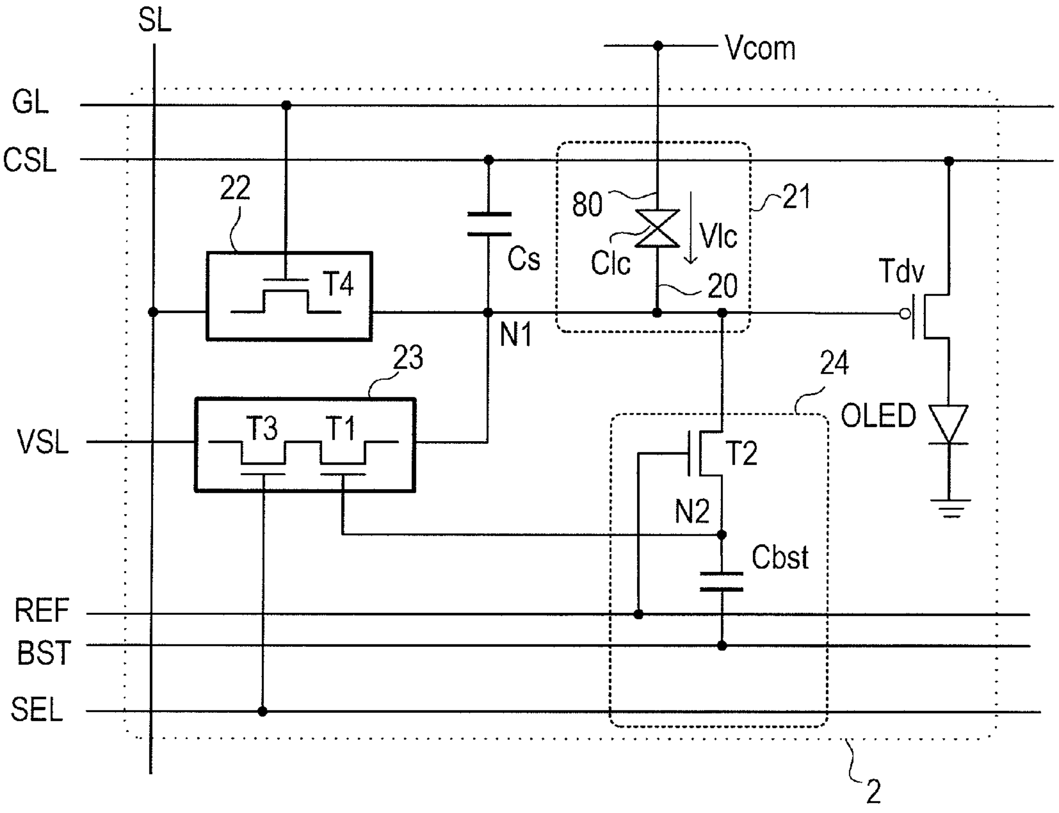
FIG. 25 is a circuit diagram showing still another basic circuit configuration of the pixel circuit of the present invention.

For example, in an organic EL (Electroluminescence) display device in which a voltage corresponding to pixel data is held in a capacity corresponding to a pixel capacity to display an image, the present invention can be especially applied with respect to a self-refresh action. FIG. 25 is a circuit diagram showing an example of a pixel circuit of the organic EL display device. In the pixel circuit, a voltage held in the auxiliary capacity Cs as pixel data is given to a gate terminal of a drive transistor Tdv configured by a TFT, and a current corresponding to the voltage flows in a light-emitting element OLED through the drive transistor Tdv. Thus, the auxiliary capacity Cs corresponds to the pixel capacity Cp in each of the embodiments.

EXPLANATION OF REFERENCES

1: Liquid crystal display device
2: Pixel circuit
2A, 2B, 2C, 2D, 2E, 2F: Pixel circuit
10: Active matrix substrate
11: Display control circuit
12: Counter electrode drive circuit
13: Source driver
14: Gate driver
20: Pixel electrode
21: Display element unit
22: First switch circuit
23: Second switch circuit
24: Control circuit
31: Delay circuit
74: Seal member
75: Liquid crystal layer
80: Counter electrode
81: Counter substrate
Amp: Analog amplifier
BST: Boost line
Cbst: Boost capacitor element
Clc: Liquid crystal display element
CML: Counter electrode wire
CSL: Auxiliary capacitive line
Cs: Auxiliary capacitor element
Ct: Timing signal
DA: Digital image signal
Dv: Data signal
GL (GL1, GL2, . . . , GLn): Gate line
Gtc: Scanning-side timing control signal
N1: Internal node
N2: Output node
OLED: Light emitting element
P1, P2: Phase
P10, P11, . . . , P18: Phase
P20, P21, . . . , P27: Phase
REF: Reference line
Sc1, Sc2, . . . , Scm: Source signal
SEL: Selecting line
SL (SL1, SL2, . . . , SLm): Source line
Stc: Data-side timing control signal
T1, T2, T3, T4, T5: Transistor
TD: Delaying transistor
Tdv: Drive transistor
Vcom: Counter voltage
Vlc: Liquid crystal voltage
VN1: Internal node potential
VN2: Output node potential

The invention claimed is:

1. A display device, having a pixel circuit group provided by arranging a plurality of pixel circuits, wherein the pixel circuit includes:

a display element unit including a unit display element;

an internal node that is a part of the display element unit and holds a voltage of pixel data applied to the display element unit;

a first switch circuit that transfers the voltage of the pixel data supplied from a data signal line to the internal node through at least a predetermined switch element;

a second switch circuit that transfers a voltage supplied to a predetermined voltage supply line to the internal node without passing through the predetermined switch element; and a control circuit that holds a predetermined voltage depending on the voltage of the pixel data held by the internal node at one end of a first capacitor element and controls on/off of the second switch circuit, the second switch circuit includes a first transistor element and a third transistor element, the control circuit includes a second transistor element, and each of the first to third transistor elements has a first terminal, a second terminal, and a control terminal that controls conduction between the first and second terminals, the second switch circuit is configured by a series circuit of the first transistor element and the third transistor element, the control circuit is configured by a series circuit of the second transistor element and the first capacitor element, one end of the first switch circuit is connected to the data signal line, one end of the second switch circuit is connected to the voltage supply line, the other ends of the first and second switch circuits and the first terminal of the second transistor element are connected to the internal node, the control terminal of the first transistor element, the second terminal of the second transistor element, and one end of the first capacitor element are connected to each other to form an output node of the control circuit, the control terminal of the second transistor element is connected to a first control line, the control terminal of the third transistor element is connected to a second control line, the other end of the first capacitor element is connected to the third control line, the predetermined switch element is a fourth transistor element having a first terminal, a second terminal, and a control terminal that controls conduction between the first and second terminals, and the control terminal is connected to a scanning signal line, a data signal line drive circuit that independently drives the data signal lines, a control line drive circuit that independently drives the first and second control lines, and a scanning signal line drive circuit that drives the scanning signal line are provided, in a self-refresh action for compensating for a voltage change of the internal nodes at the same time by operating the second switch circuits and the control circuits in the plurality of pixel circuits, the scanning signal line drive circuit applies a predetermined voltage to the scanning signal lines connected to all the pixel circuits included in the pixel circuit group to turn off the fourth transistor elements, the control line drive circuit applies a predetermined voltage to the second control line to turn off the third transistor element, and applies a first control voltage to the first control line such that when a voltage state of binary pixel data held by the internal node is in a first voltage state, a current flowing from one end of the first capacitor element to the internal node is cut off by the second transistor element, and when the voltage state is in a second voltage state, the second transistor element is turned on, thereafter, the control line drive circuit applies a first boost voltage to the third control line to give a voltage change caused by capacitive coupling through the first capacitor element to one end of the first capacitor element, so that when the voltage of the internal node is in the first voltage state, the voltage change is not suppressed and the first transistor element is turned on, thereafter, the control line drive circuit changes an applied voltage to the first control line into a second control voltage, so that a current flowing from one end of the first capacitor element to the internal node is cut off by the second transistor element regardless of whether the voltage state of the internal node is in the first voltage state or the second voltage state, thereafter, the control line drive circuit changes an applied voltage to the third control line into a second boost voltage that is closer to a ground voltage than the first boost voltage to give a voltage change caused by capacitive coupling through the first capacitor element to one end of the first capacitor element so as to shift a potential of the output node toward the ground potential, so that when the voltage state of the internal node is in the first voltage state, the first transistor element is continuously turned on, and when the voltage state is in the second voltage state, the first transistor element is turned off, and, thereafter, the control line drive circuit changes an applied voltage to the second control line to turn on the third transistor element so as to supply the voltage of the pixel data in the first voltage state to all the voltage supply lines connected to the plurality of pixel circuits targeted by the self-refresh action.

2. The display device according to claim 1, wherein the data signal lines also serve as the voltage supply lines, and, after the control line drive circuit changes an applied voltage to the second control line to turn on the third transistor element, in place of the control line drive circuit, the data signal line drive circuit supplies the voltage of the pixel data in the first voltage state to all the data signal lines connected to the plurality of pixel circuits targeted by the self-refresh action.

3. The display device according to claim 1, wherein the pixel circuit further includes a second capacitor element having one end connected to the internal node and the other end connected to a fourth control line, the fourth control line also serves as the voltage supply line, and, after the control line drive circuit changes an applied voltage to the second control line to turn on the third transistor, the control line drive circuit supplies the voltage of the pixel data in the first voltage state to all the fourth control lines connected to the plurality of pixel circuits targeted by the self-refresh action.

4. The display device according to claim 1, wherein the pixel circuit has a configuration in which the first switch circuit does not include a switch element except for the fourth transistor element, and the first terminal and the second terminal of the fourth transistor element are connected to the internal node and the data signal line, respectively.

5. The display device according to claim 1, wherein in the pixel circuit, the first switch circuit is configured by a series circuit of the third transistor element in the second switch circuit and the fourth transistor element or a series circuit of a fifth transistor having a control terminal connected to the control terminal of the third transistor element in the second switch circuit and the fourth transistor element.

6. The display device according to claim 1, wherein the plurality of pixel circuits are arranged in each of a row direction and a column direction to configure a pixel circuit array, the data signal line is arranged for each of the columns one by one, the scanning signal line is arranged for each of the rows one by one, the pixel circuits arranged in the same column have one ends of the first switch circuits connected to a common data signal line, the pixel circuits arranged in the same row or the same column have the control terminals of the second transistor elements connected to a common first control line, the pixel circuits arranged in the same row or the same column have the control terminals of the third transistor elements connected to a common second control line, and the pixel circuits arranged in the same row or the same column have the other ends of the first capacitor elements connected to a common third control line.

* * * * *